United States Patent [19]

Heya et al.

[11] Patent Number: 5,967,595
[45] Date of Patent: *Oct. 19, 1999

[54] SLIDING DOOR SUPPORTING APPARATUS

[75] Inventors: Shusaku Heya, Anjo; Masatake Nakashima, Okazaki; Kenzou Kawaguchi, Toyota; Hisayoshi Katoh, Okazaki, all of Japan

[73] Assignees: Mitsubishi Jidosha Kogyo Kabushiki Kaisha; Mitsubishi Jidosha Engineering Kabushiki Kaisha

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,607

[22] Filed: Apr. 9, 1997

[30] Foreign Application Priority Data

Apr. 9, 1996 [JP] Japan .................................. 8-086721
Jan. 29, 1997 [JP] Japan .................................. 9-015555

[51] Int. Cl.⁶ ........................................................ B60J 5/06
[52] U.S. Cl. .............................................. 296/155; 49/213
[58] Field of Search ................................. 296/155, 146.1; 49/360, 361, 362, 213, 407; 292/DIG. 46

[56] References Cited

FOREIGN PATENT DOCUMENTS

| | | |
|---|---|---|
| 401-081 | 12/1990 | European Pat. Off. ................ 296/155 |
| 2133937 | 12/1972 | France . |
| 3312-999 | 10/1984 | Germany ................................ 296/155 |
| 3611641 A1 | 8/1987 | Germany . |
| 50-1229 | 1/1975 | Japan . |
| 313220 U | 2/1991 | Japan . |
| 751386Y2 | 11/1995 | Japan . |
| 789750 | 1/1958 | United Kingdom . |

Primary Examiner—D. Glenn Dayoan
Assistant Examiner—Jason Morrow

[57] ABSTRACT

A sliding door attached to a vehicle is supported on the body of the vehicle by way of a sliding door supporting apparatus, which comprises a center guide mechanism, an upper guide mechanism, and a lower guide mechanism. The center guide mechanism is provided with a holdback mechanism for restraining the sliding door from shifting its position in the transverse direction when the door is moved to a fully open position. The holdback mechanism includes a vertical wall formed on a center rail, inside and outside holdback rollers of which the positions in the transverse direction are restrained by the vertical wall. The upper and lower guide mechanisms are provided, respectively, with upper and lower check mechanisms for holding the sliding door in the fully open position. The center and lower guide mechanisms are each provided with a roller for supporting vertical load of the sliding door.

16 Claims, 19 Drawing Sheets

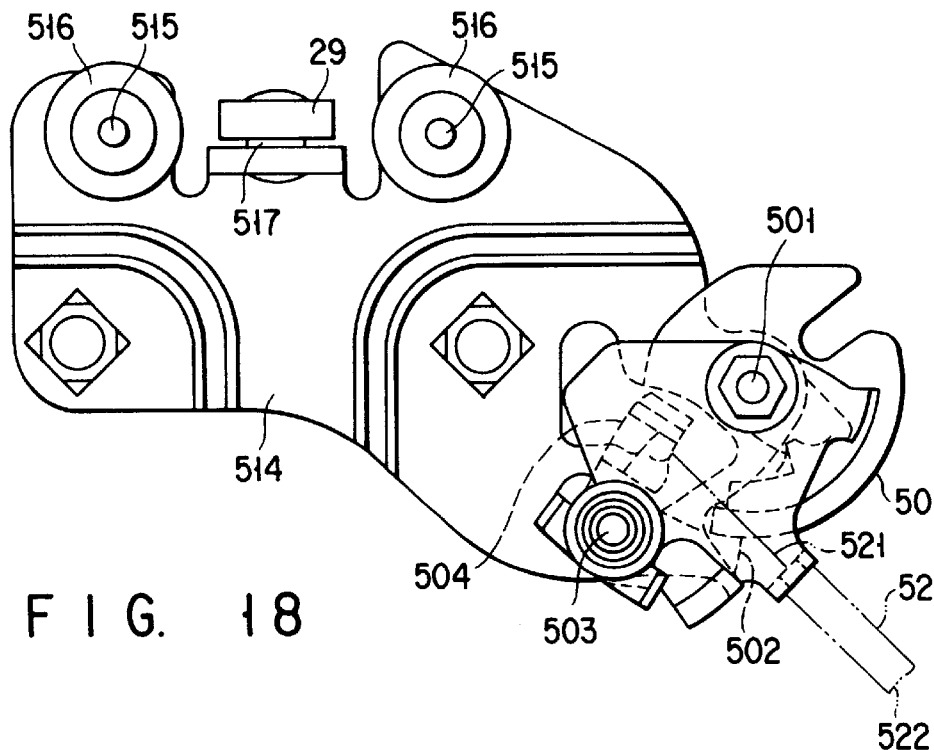
F I G. 18
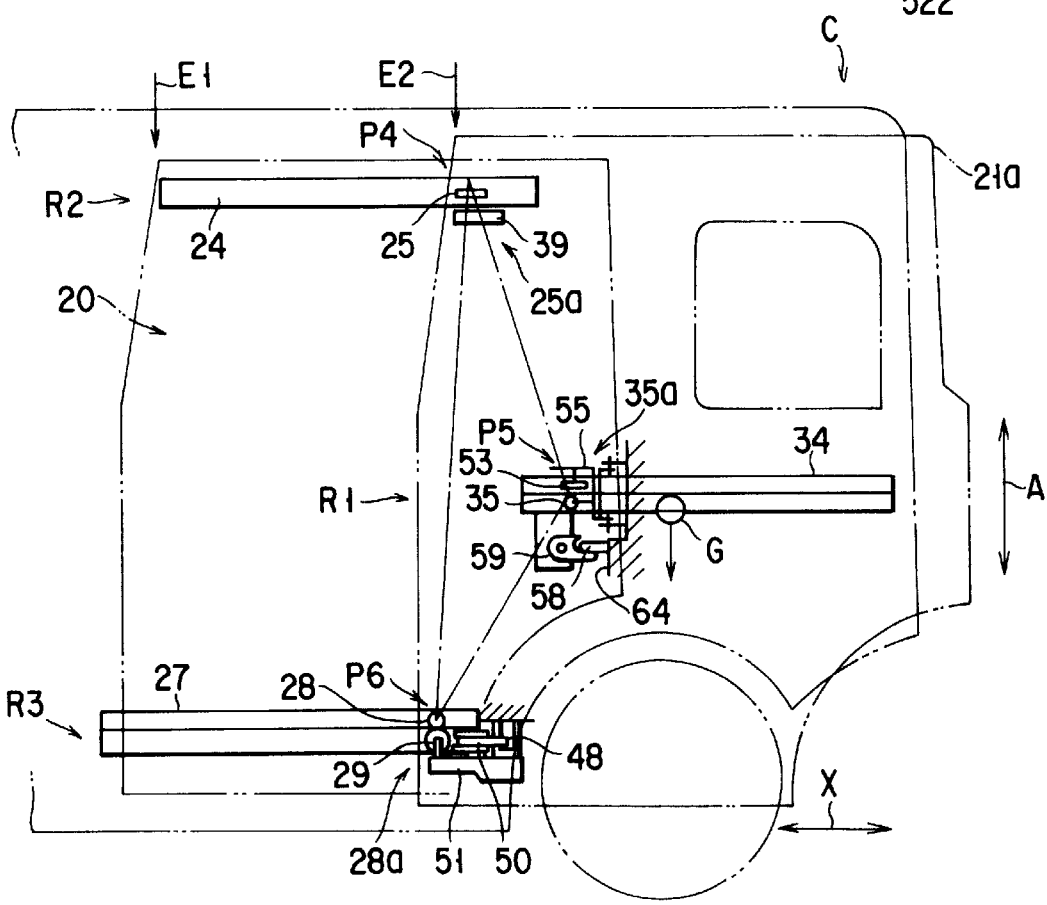
F I G. 19

SLIDING DOOR SUPPORTING APPARATUS

BACKGROUND OF THE INVENTION

The present invention relates to an apparatus for supporting a sliding door, which serves to open and close an entrance in the flank of the body of a vehicle, on the vehicle body, and more particularly, to a sliding door supporting apparatus provided with means for restraining the sliding door in a fully open state from being dislocated in various directions.

In many vehicles, such as one-box-cars, station wagons, etc., in particular, an opening as an entrance for users is formed in a side wall of their body, and a sliding door is used to open and close the opening. A sliding door supporting apparatus for supporting the sliding door of this type comprises upper and lower guide mechanisms, attached to the upper and lower parts, respectively, of the entrance, and a center guide mechanism attached to the vertical middle part of an outer wall at the rear portion of the vehicle body.

Usually, these guide mechanisms include upper, center, and lower rails attached to the vehicle body and rollers on the sliding door. Each roller engages its corresponding rail so as to be rollable thereon.

In this case, the upper, center, and lower guide mechanisms support the load of the door in positions of rolling contact between the guide rails and the rollers. Accordingly, the center of gravity of the door is situated within a region surrounded by line segments that connect the upper, center, and lower rolling contact positions. This positional relationship never changes even though the door moves from its fully closed position to its fully open position. Thus, the sliding door supporting apparatus of this type can support the sliding door substantially steadily on the vehicle body. According to the supporting apparatus in which all the rails are provided on the vehicle body in the aforesaid manner, however, the center rail is attached to the outer wall at the rear portion of the vehicle body, so that the external appearance of the vehicle body is poor. There is a known sliding door supporting apparatus in which the center rail is provided on the door side, thereby solving this problem.

In a sliding door supporting apparatus shown in FIGS. 25 and 26, for example, an upper rail 3 and a lower rail 4 are attached to the upper and lower parts, respectively, of a side opening 2 of a vehicle body 1. Also, a center rail 6 is attached to the inner surface of a sliding door 5. The door 5 is provided with upper and lower rollers 7 and 8, which engage the upper and lower rails 3 and 4, respectively. A center roller 9 that engages the center rail 6 is provided on the vehicle body side.

In the sliding door supporting apparatus constructed in this manner, the door load is supported in positions p1, p3 and p2 of rolling contact between the guide rails 3, 4 and 6 and the rollers 7, 8 and 9. The upper and lower contact positions p1 and p3, among these rolling contact positions, move rearward in the longitudinal direction X of the vehicle body as the sliding door 5 is moved to the fully open position. Despite the movement of the door 5 to the fully open position, on the other hand, the center rolling contact position p2 never substantially moves in the longitudinal direction X.

Thus, when the sliding door 5 is in the fully closed position, as shown in FIG. 25, the upper and lower rolling contact positions p1 and p3 are situated at a distance L1 from the center rolling contact position p2 with respect to the longitudinal direction X. In this case, the center of gravity G of the door 5 is situated substantially on the center of a region surrounded by line segments that connect the three rolling contact positions p1, p2 and p3, so that the door 5 can be supported with stability.

When the sliding door 5 is moved to the fully open position, as shown in FIG. 26, a center check member 10 and an upper check member 13 on the door side engage strikers 12 and 14 on the vehicle body side, respectively, thereby holding the door 5 in the fully open position. As this is done, the upper and lower rolling contact positions p1 and p3 approach the center rolling contact position p2 with respect to the longitudinal direction X, so that the distance L1' between the contact positions is considerably shorter than the distance L1 for the case where the door is fully closed (L1'<L1). Inevitably, therefore, the three rolling contact positions p1, p2 and p3 are concentrated on the front portion of the sliding door 5. Thus, the center of gravity G of the door 5 is situated behind the positions p1, p2 and p3, so that the door 5 is liable to be dislocated in its vertical direction A, longitudinal direction X, and transverse direction (perpendicular to the drawing plane of FIG. 26).

A sliding door supporting apparatus described in Jpn. UM Appln. KOKOKU Publication No. 50-1229 is provided with a narrower second center rail on the outer wall of the vehicle body, besides the center rail on the sliding door. When the door is fully closed, according to this supporting apparatus, it is supported in the position of rolling contact between the first center rail and its corresponding roller. When the door is fully open, it is supported in the position of rolling contact between the second center rail and its corresponding roller. In this manner, the sliding door can be restrained in some measure from being dislocated in the vertical and transverse directions.

According to the arrangement described in Jpn. UM Appln. KOKOKU Publication No. 50-1229, however, the second center rail must be provided on the outer wall of the vehicle body, so that the external appearance of the vehicle body is marred inevitably. In order to allow the sliding door to move smoothly in the longitudinal direction, moreover, a gap with some width must be secured between the second center rail and the roller. The presence of the gap causes the door to be dislocated in the vertical and transverse directions. Moreover, this sliding door supporting apparatus cannot restrain the sliding door from being dislocated in the As shown in FIG. 26, for example, means for restraining longitudinal dislocation of the sliding door in the fully open position includes the center and upper check members 10 and 13 on the sliding door 5 and the strikers 12 and 14 on the vehicle body side, which can engage the members 10 and 13, respectively. This arrangement is described in Jpn. UM Appln. KOKOKU Publication No. 7-51386 (or Jpn. UM Appln. KOKAI Publication No. 3-13220). This conventional sliding door supporting apparatus comprises a center rail attached to the sliding door, a roller attached to the vehicle body and in rolling contact with the center rail, a check member attached to the door, etc. A part of a shaft for supporting the center roller is used as the striker. This striker and the check member constitutes a check mechanism. In this prior art supporting apparatus, however, the check mechanism is provided only on the vertical middle part of the sliding door, so that it is difficult to securely restrain the door from being dislocated in various directions.

The sliding door supporting apparatus shown in FIGS. 25 and 26 comprises a center check mechanism, including the center check member 10 and the striker 12, and an upper check mechanism, including the upper check member 13 and the striker 14, in order to restrain the sliding door 5 in the fully open position from being dislocated in the vertical and longitudinal directions A and X. However, these check mechanisms are situated at a relatively long distance from the lower end portion of the door 5 that is liable to be dislocated to the highest degree, so that the door 5 may not be able to be securely restrained from being dislocated in the vertical and longitudinal directions A and X, in some cases. Moreover, it is difficult to securely restrain the dislocation of the sliding door 5, especially the rear end portion thereof, in the transverse direction (perpendicular to the drawing plane).

Thus, the sliding door supporting apparatus having its center rail on the door side cannot easily support the sliding door in the fully open position with stability. Accordingly, there has been a demand that the dislocation of the sliding door (relative to the vehicle body) be restrained more securely by steadily supporting the door in the fully open state.

BRIEF SUMMARY OF THE INVENTION

Accordingly, the object of the present invention is to provide a sliding door supporting apparatus, which includes a center rail attached to a sliding door of a vehicle lest the external appearance of the body of the vehicle be marred, and in which the door can be more securely restrained from being dislocated when it is fully open.

According to the present invention, there is provided a sliding door supporting apparatus for supporting a sliding door, located in an opening in a side face of the body of a vehicle, on the vehicle body so as to be slidable between a fully closed position and a fully open position, comprising: a first guide mechanism including: a first rail attached to the vertical middle part of the sliding door and extending in the longitudinal direction of the vehicle; and first roller means attached to the vehicle body and adapted to engage the first rail so as to be rollable thereon, thereby supporting the sliding door for movement in the longitudinal direction of the vehicle; a second guide mechanism including: a second rail attached to the upper part of the opening in the vehicle body and extending in the longitudinal direction of the vehicle; and second roller means attached to the upper part of the sliding door and adapted to engage the second rail so as to be rollable thereon, thereby supporting the door for movement in the longitudinal direction of the vehicle; a third guide mechanism including: a third rail attached to the lower part of the opening in the vehicle body and extending in the longitudinal direction of the vehicle; and third roller means attached to the lower part of the sliding door and adapted to engage the third rail so as to be rollable thereon, thereby supporting the door for movement in the longitudinal direction of the vehicle; and a holdback mechanism attached to at least one of the three guide mechanisms and adapted to restrain the sliding door from shifting in the transverse direction of the vehicle when the door is in the fully open position.

According to the present invention arranged in this manner, the sliding door is restrained from shifting its position in the transverse direction so that it can be securely prevented from being dislocated in the transverse direction when it is moved to the fully open position.

For ease of arrangement, the holdback mechanism includes a vertical wall provided at the rail of at least one of the guide mechanisms and having outer and inner surfaces extending in the longitudinal direction of the vehicle, and at least one outside holdback roller and at least one inside holdback roller included in the roller means and arranged individually on the opposite sides of the vertical wall, and the distance between a plurality of the holdback rollers is a distance such that the holdback rollers can be in contact with the outer and inner surfaces of the vertical wall when the sliding door is in the fully open position.

Further, the vertical wall has a thickness such that the holdback rollers can be in contact with the outer and inner surfaces of the vertical wall in positions where the holdback rollers are situated when the sliding door is moved to the fully open position.

In order to facilitate the longitudinal movement of the sliding door, the vertical wall includes a narrow portion having a thickness such that the holdback rollers can separate from the outer and inner surfaces of the vertical wall when the sliding door is situated in any other position than the fully open position.

In order to restrain the sliding door more securely from shifting its position in the transverse direction, the holdback rollers include a pair of holdback rollers facing each other across the vertical wall and constituting one roller set.

Further, a plurality of the roller sets are arranged spaced in the longitudinal direction of the vehicle.

In order to restrain the sliding door in the fully open position from shifting in the longitudinal direction, the third guide mechanism includes lower check means for restraining the position of the lower part of the sliding door in the longitudinal direction of the vehicle when the door is in the fully open position, and at least one of the first and second guide mechanisms includes center or upper check means for restraining the position of the door in the longitudinal direction of the vehicle when the door is in the fully open position.

With this arrangement, the sliding door can be securely restrained from being dislocated in the longitudinal direction. In particular, the lower rear end portion of the door, which is liable to dislocation, can be securely restrained from being dislocated.

The check means includes a striker, attached to the rail or the roller means of the guide mechanism, and a check member attached to the roller means or the rail and adapted to engage the striker when the sliding door is moved to the fully open position.

In order to restrain the sliding door in the fully open position from vertically shifting its position, moreover, the roller means of the third guide mechanism and either the roller means of the first guide mechanism or the roller means of the second guide mechanism include a roller each for supporting a vertical load of the sliding door.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 18 is a plan view of a lower check member and a rocking plate shown in FIG. 8;

FIG. 19 is a side view of a part of a vehicle with a sliding door supporting apparatus according to another embodiment of the invention, the door of the vehicle being fully open;

DETAILED DESCRIPTION OF THE INVENTION

Figure 1:
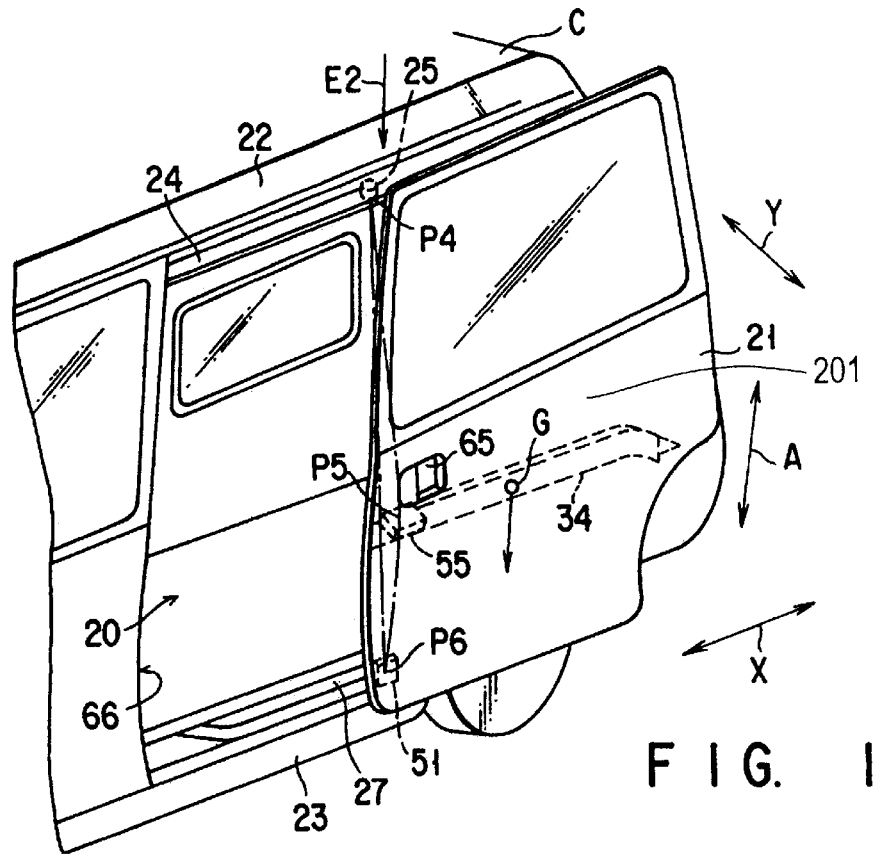
FIG. 1 is a perspective view of a part of a vehicle with a sliding door supporting apparatus according to an embodiment of the present invention, the door of the vehicle being fully open.
Figure 2:
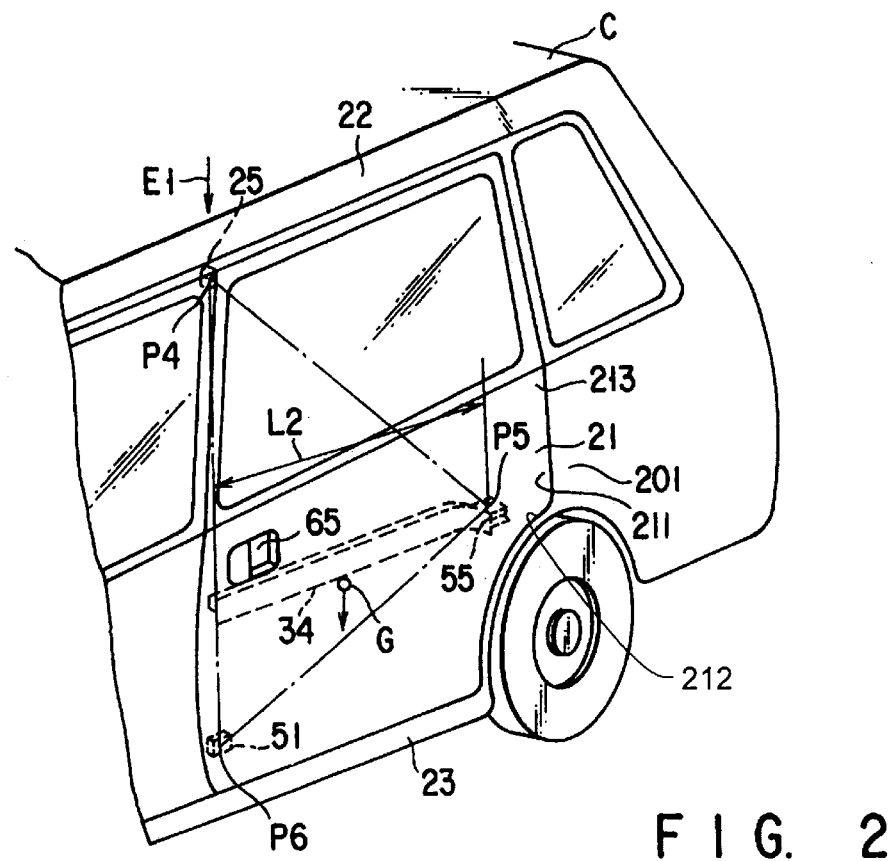
FIG. 2 is a perspective view of the vehicle shown in FIG. 1, having its door fully closed.
Figure 3:
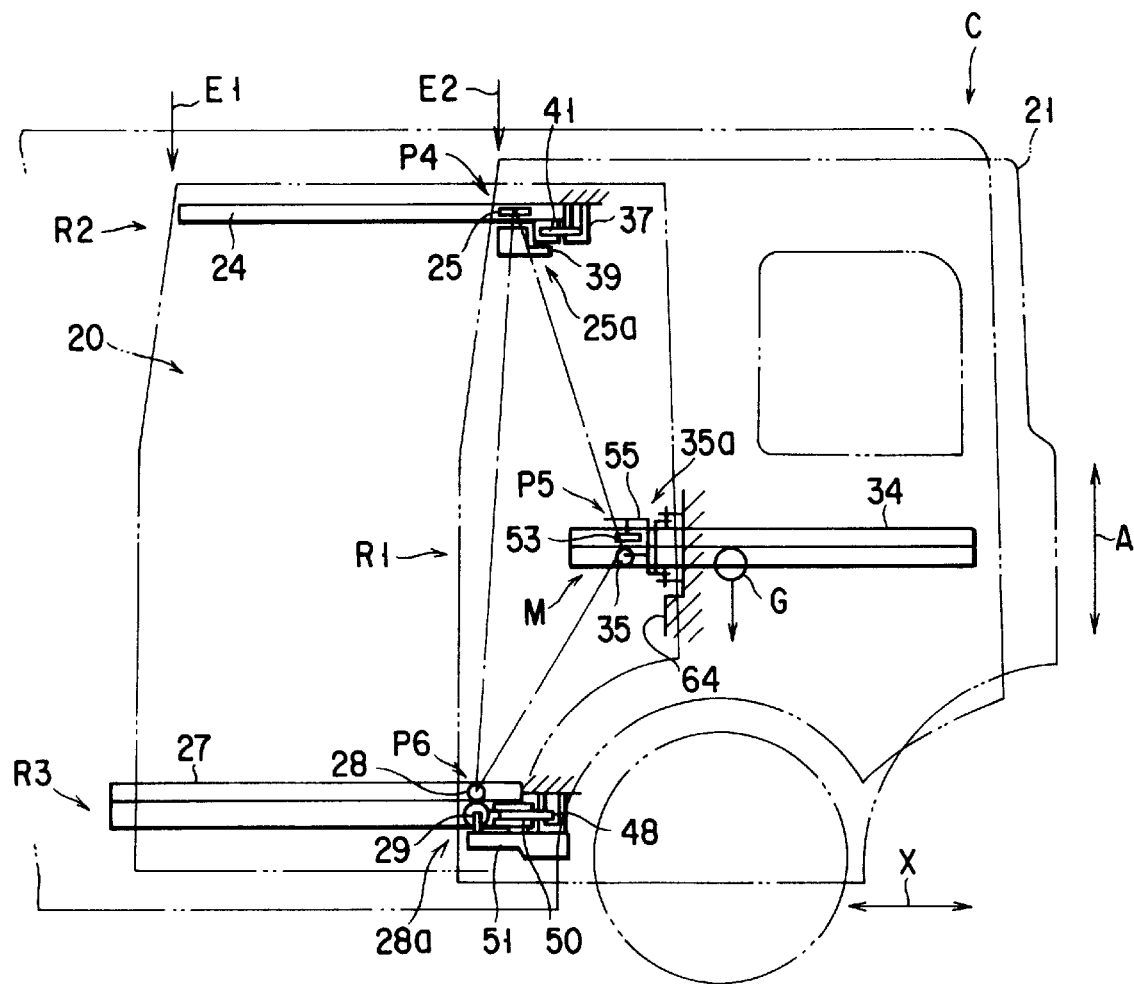
FIG. 3 is a side view of the part of the vehicle shown in FIG. 1, the door being fully open.

FIGS. 1 to 3 show a sliding door supporting apparatus according to an embodiment of the present invention. This supporting apparatus supports a sliding door 21 for opening and closing an entrance (opening) 20 of a one-box car C. The front and rear edge portions of the entrance 20 are defined by a rear wall 66 of a center pillar and a front wall of a rear pillar 64 (shown in FIG. 3), respectively. The upper and rear edge portions of the entrance 20 are defined by a roof side rail 22 (shown in FIG. 5) and a side sill 23, respectively.

Figure 5:
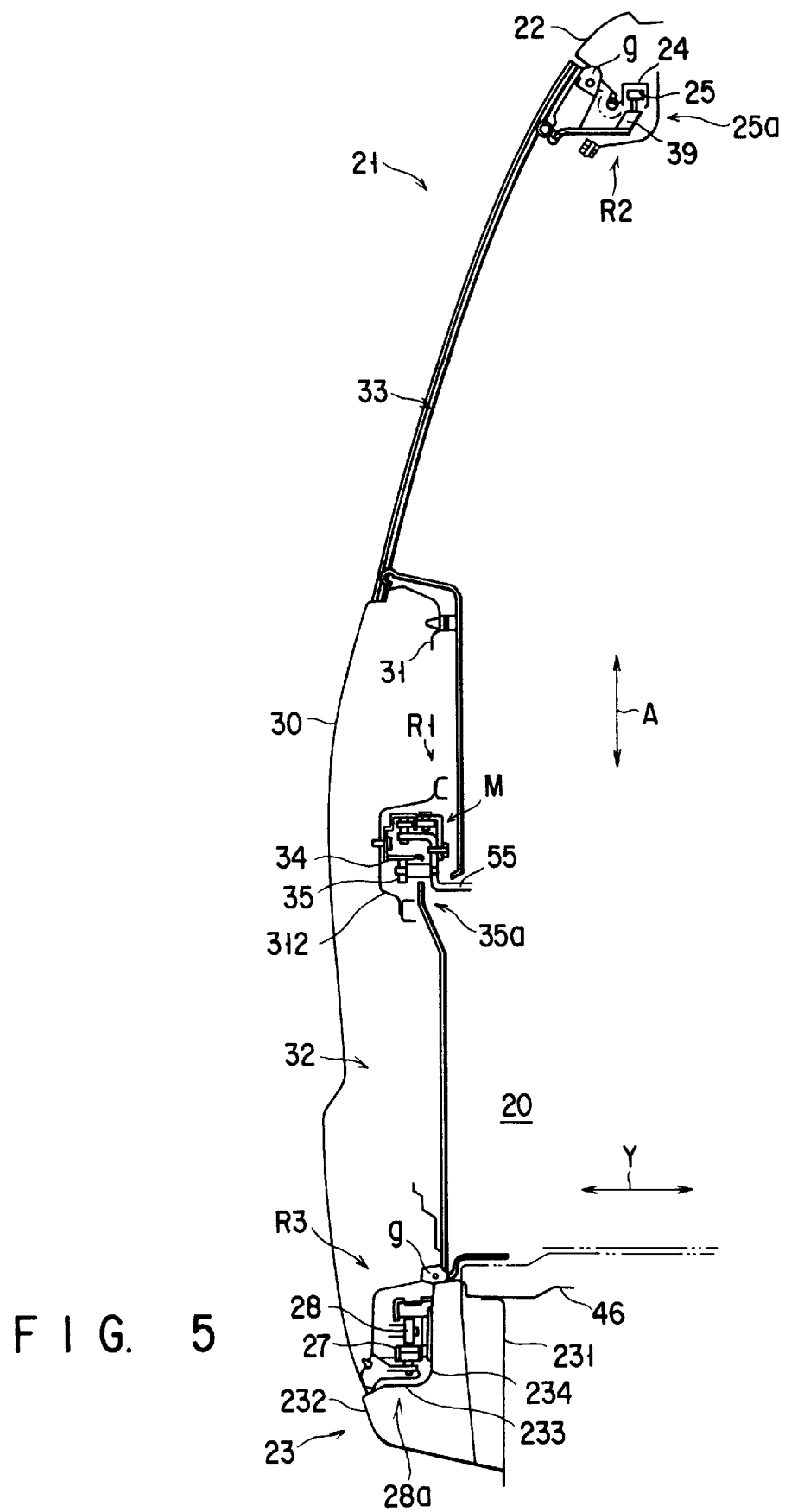
FIG. 5 is a vertical sectional view showing a part of the sliding door of FIG. 4.

As shown in FIG. 5, the side sill 23 is composed of an inner panel 231, an outer panel 232 superposed on the panel 231, etc. A floor panel 46 is connected to the upper end portion of the inner panel 231. A stepped portion 233 is formed on a substantially middle part (with respect to the vertical direction) of the outer panel 232 that is situated at the lower part of the entrance 20. An inside vertical wall 234 extends from the inner end of the stepped portion 233. The upper end of the vertical wall 234 is joined to the upper part of the inner panel 231. This sliding door 21 is provided with an outer panel 30 and an inner panel 31. The respective peripheral edge portions of the panels 30 and 31 are welded to each other. A window 33 is formed over the panels 30 and 31.

Figure 4:
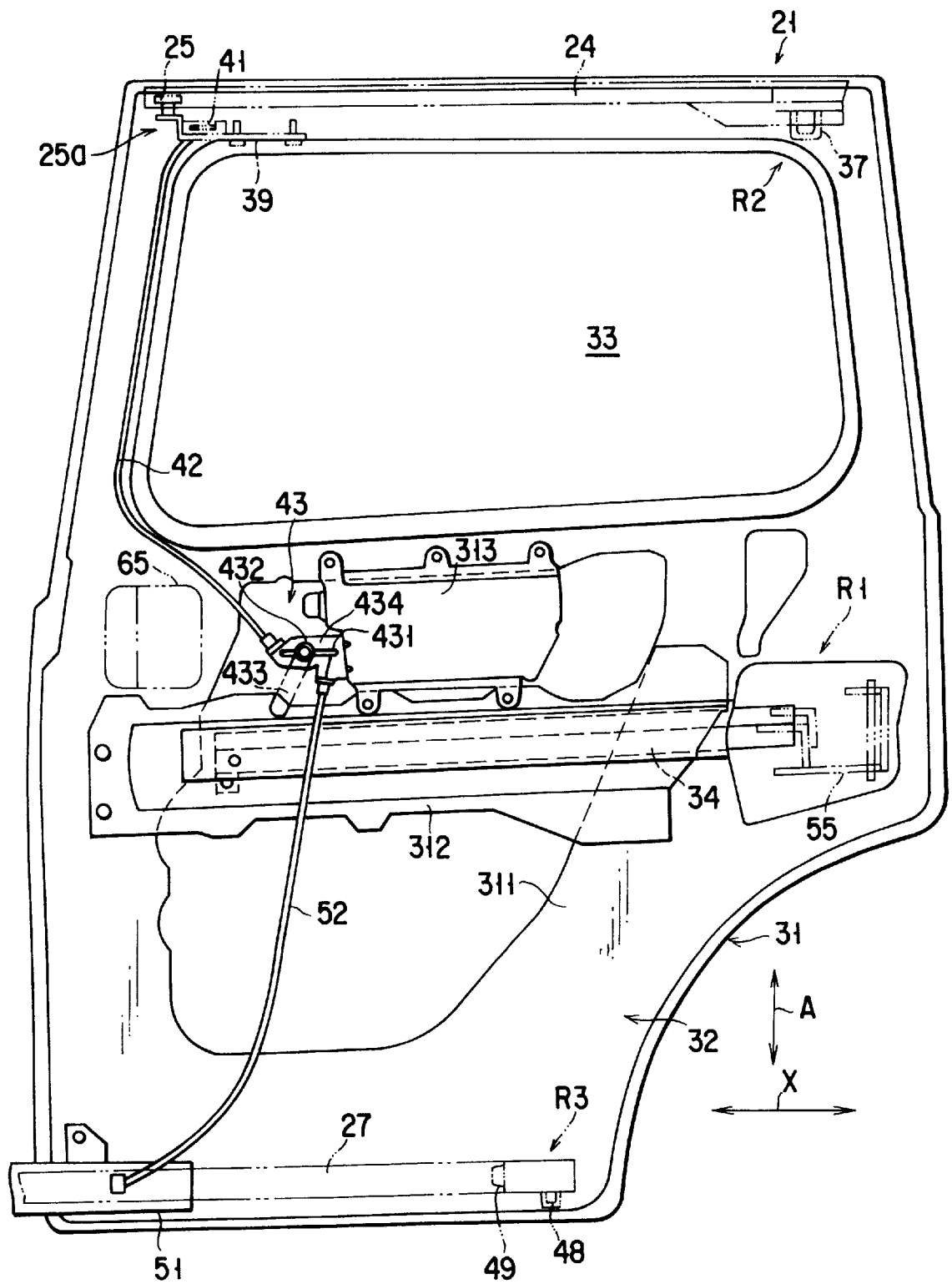
FIG. 4 is a side view showing the sliding door supported by the sliding door supporting apparatus of FIG. 1, having its outer panel removed.

In FIG. 4, the outer panel and a door trim are omitted to facilitate a proper understanding of the construction of the sliding door 21. The inner panel 31 is composed of a main portion 311 formed having a plurality of apertures, a reinforcing plate 312 fixed to the center of the main portion 311, a bracket 313 fixed to both the center of the plate 312 and the main portion, etc. The outer peripheral edge portion of the main portion 311 of the inner panel 31 has a shape such that it faces the inner peripheral wall of the entrance 20 at a predetermined distance therefrom. A seal member q (shown in FIG. 5) is provided on the outer peripheral edge of the main portion 311. The seal member a serves to seal the space between the inner peripheral wall of the entrance 20 and the sliding door 21 when the door is closed.

The sliding door 21 is supported on the body of the vehicle by means of a center guide mechanism R1 as a first guide mechanism, an upper guide mechanism R2 as a second guide mechanism, and a lower guide mechanism R3 as a third guide mechanism.

As shown in FIGS. 3, 4 and 5, the center guide mechanism R1 includes a center rail 34 attached to the sliding door 21 and a center roller 35 mounted on the rear pillar 64 that constitutes the rear end edge portion of the vehicle body. The center roller 35 engages the center rail 34 so as to be rollable thereon. The roller 35 constitutes a part of first roller means 35a for supporting the vertical middle part of the sliding door 21 for movement in the longitudinal direction of the vehicle.

The upper guide mechanism R2 includes an upper rail 24 attached to the vehicle body and an upper roller 25 mounted on the sliding door 21. The upper roller 25 engages the upper rail 24 so as to be rollable thereon. The roller 25 functions as second roller means 25a for supporting the upper part of the door 21 for movement in the longitudinal direction of the vehicle.

The lower guide mechanism R3 includes a lower rail 27 attached to the vehicle body and a lower roller 28 mounted on the sliding door 21. The lower roller 28 engages the lower rail 27 so as to be rollable thereon. The roller 28 constitutes a part of third roller means 28a for supporting the lower portion of the sliding door 21 for movement in the longitudinal direction of the vehicle.

Figure 6:
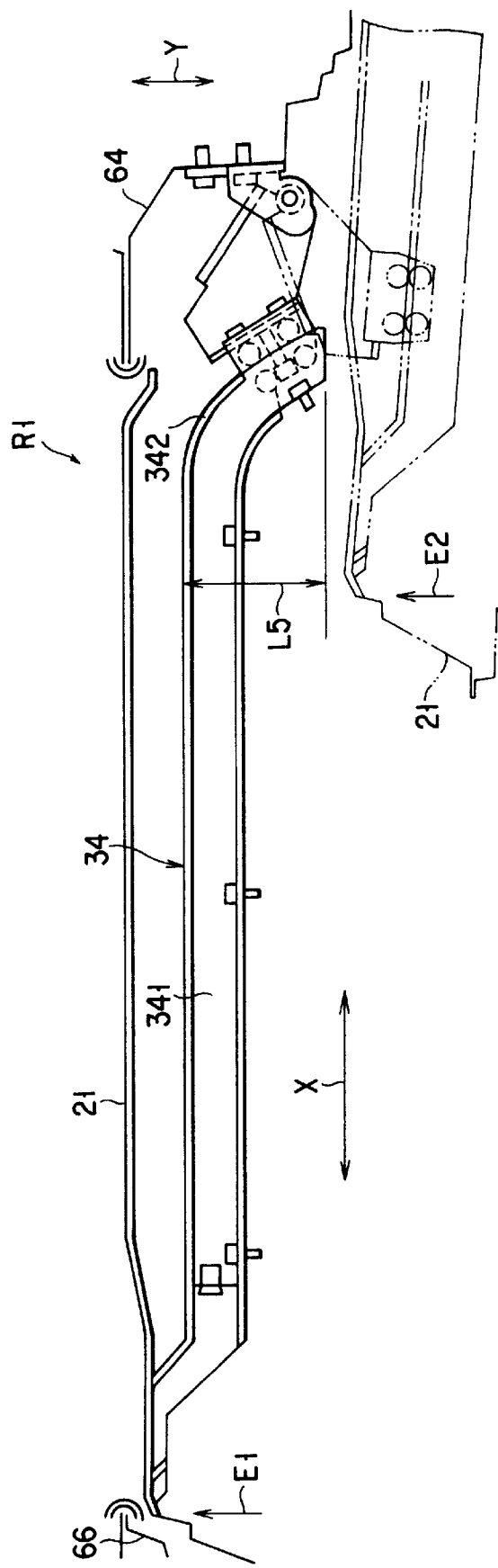
FIG. 6 is a plan view of a center rail used in the supporting apparatus of FIG. 1.

As shown in FIGS. 4, 5, 6 and 14, the center rail 34 is housed in a lateral recess 315 that is formed in the center of the reinforcing plate 312 of the inner panel 31. The rail 34 is fixed to the plate 312. As shown in FIG. 6, the center rail 34 includes a straight portion 341, which extends in the longitudinal direction X of the vehicle body, and an outwardly curved portion 342 continuous with the rear end of the straight portion 341.

The curved portion 342 is formed so that it is biased outward for a distance L5 from the straight portion 341 with respect to the vehicle body. The curved portion 342 serves to guide the sliding door 21 so that an outer wall 211 of its rear part is matched with an outside rear wall 201 of the entrance 20 when the door 21 is moved to a fully closed position E1, as shown in FIG. 2.

Figure 14:
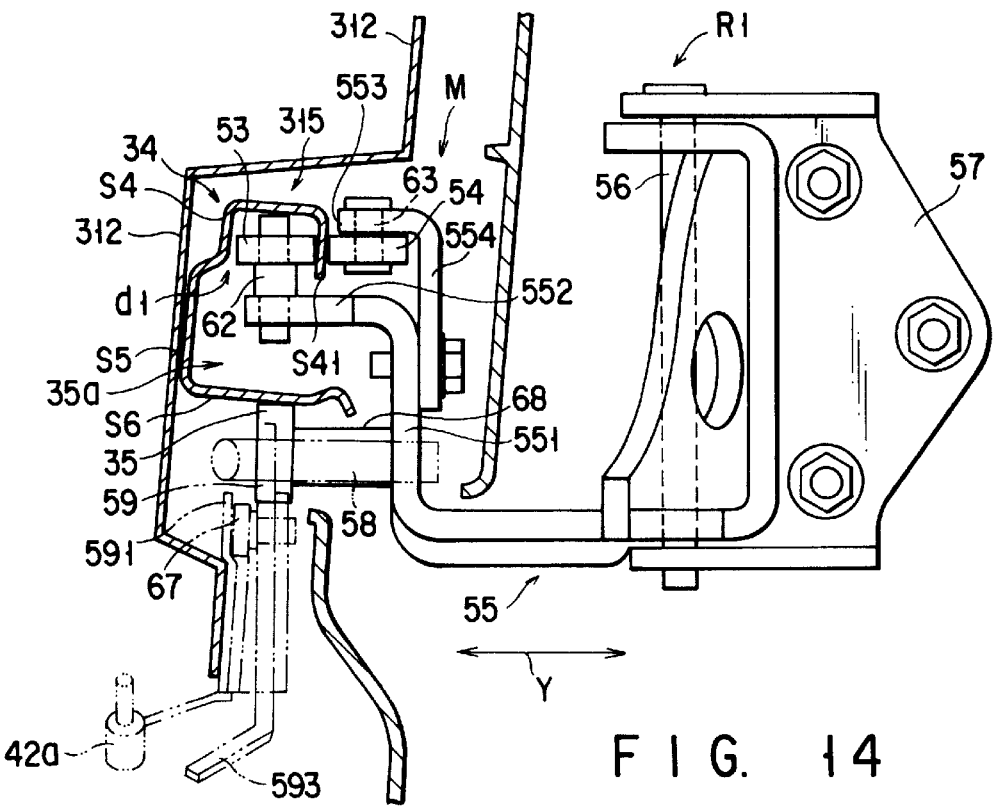
FIG. 14 is a vertical sectional view showing the center rail of FIG. 6 and a center arm.

As shown in FIG. 14, the center rail 34 is provided with an upper rectangular-profile portion S4 having an open-bottomed recess d1, a downwardly extending portion S5 extending downward from the portion S4, and a laterally extending portion S6 continuous with the lower end of the portion S5. A downward vertical wall S41 is formed on the interior side of the upper rectangular-profile portion S4.

Two outside holdback rollers 53 (mentioned later), front and rear, are rotatably arranged inside the upper rectangular-profile portion S4. Two inside holdback rollers 54, paired with the outside rollers 53, touch the inner surface of the vertical wall S41 of the portion S4 from the interior side. The vertical wall S41, two outside holdback rollers 53, and two inside holdback rollers 54 constitute a holdback mechanism M that restrains the sliding door 21 from shifting its position in the transverse direction Y.

As shown in FIG. 14, the center roller 35, which is pivotally supported on a center arm 55 on the vehicle-body side, is in contact with the lower surface of the laterally extending portion S6. The center roller 35 supports the sliding door 21 for longitudinal movement, and bears a part of the weight of the door 21. The center arm 55, which constitutes a part of the center guide mechanism R1, functions as a member for pivotally supporting the center roller 35.

The center arm 55 is rotatably supported on a base 57, which is fixed to the rear pillar 64, by means of a vertical pin 56. The arm 55 includes a vertical portion 551, a horizontal portion 552 extending outward from the upper end of the vertical portion 551, a top portion 554 having its lower end fixed to the vertical portion 551, and a lateral portion 553 extending outward from the upper end of the top portion 554. The horizontal and lateral portions 552 and 553 are directed toward the center rail 34.

Figure 13:
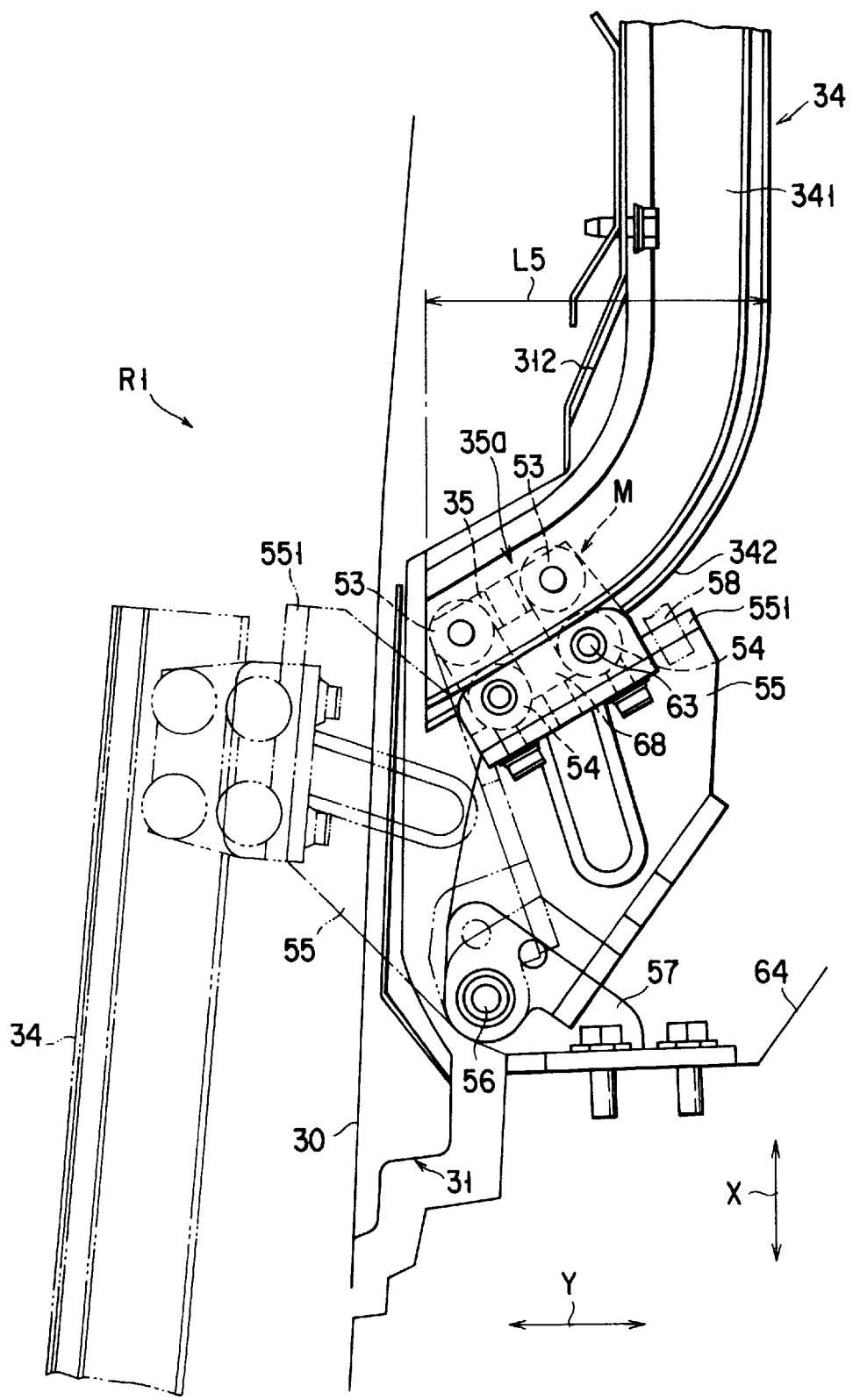
FIG. 13 is a cutaway plan view showing a part of a center guide mechanism using the center rail of FIG. 6.
Figure 15:
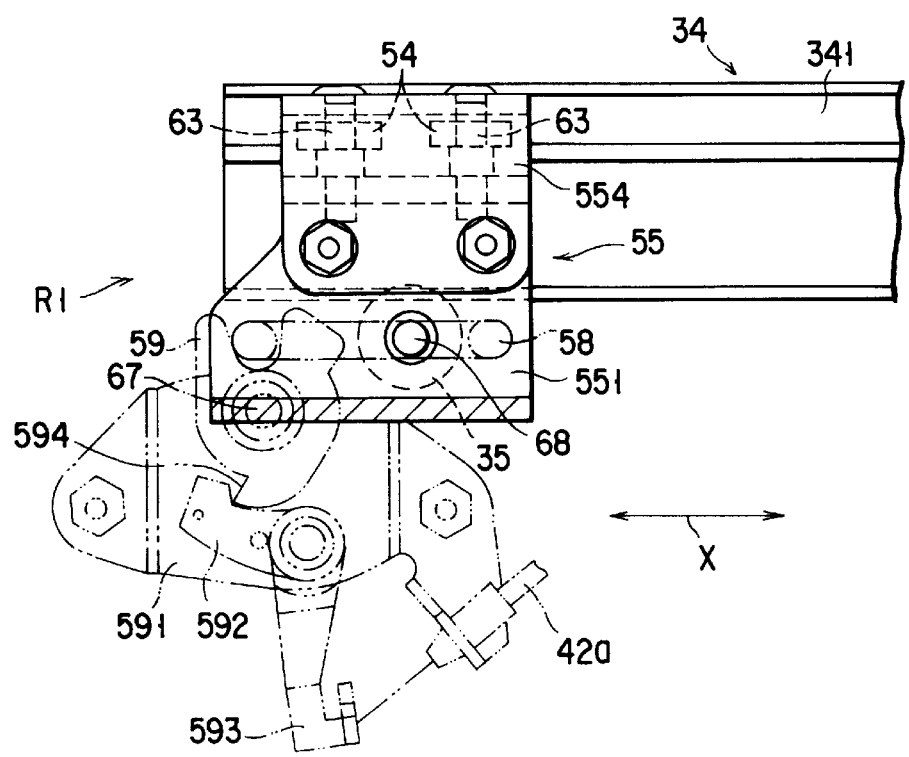
FIG. 15 is a side view, partially in section, showing the center rail of FIG. 14 and a center check mechanism.

As shown in FIGS. 13, 14 and 15, the distal end portion of the horizontal portion 552 is situated under the recess d1 of the center rail 34. The two outside holdback rollers 53 are supported on the horizontal portion 552 by means of two vertical pins 62, front and rear, individually. The lateral portion 553 faces the vertical wall S41. The two inside holdback rollers 54 are supported on the distal end side of the lateral portion 553 by means of two downward pins 63, front and rear, individually.

The vertical portion 551 faces the laterally extending portion S6. The center roller 35 is situated right under the portion S6, and is supported by a lateral pin 68 that is provided on the vertical portion 551. That part of the weight of the sliding door 21 which is borne by the center roller 35 is supported on the vehicle body by means of the vertical portion 551.

Figure 7:
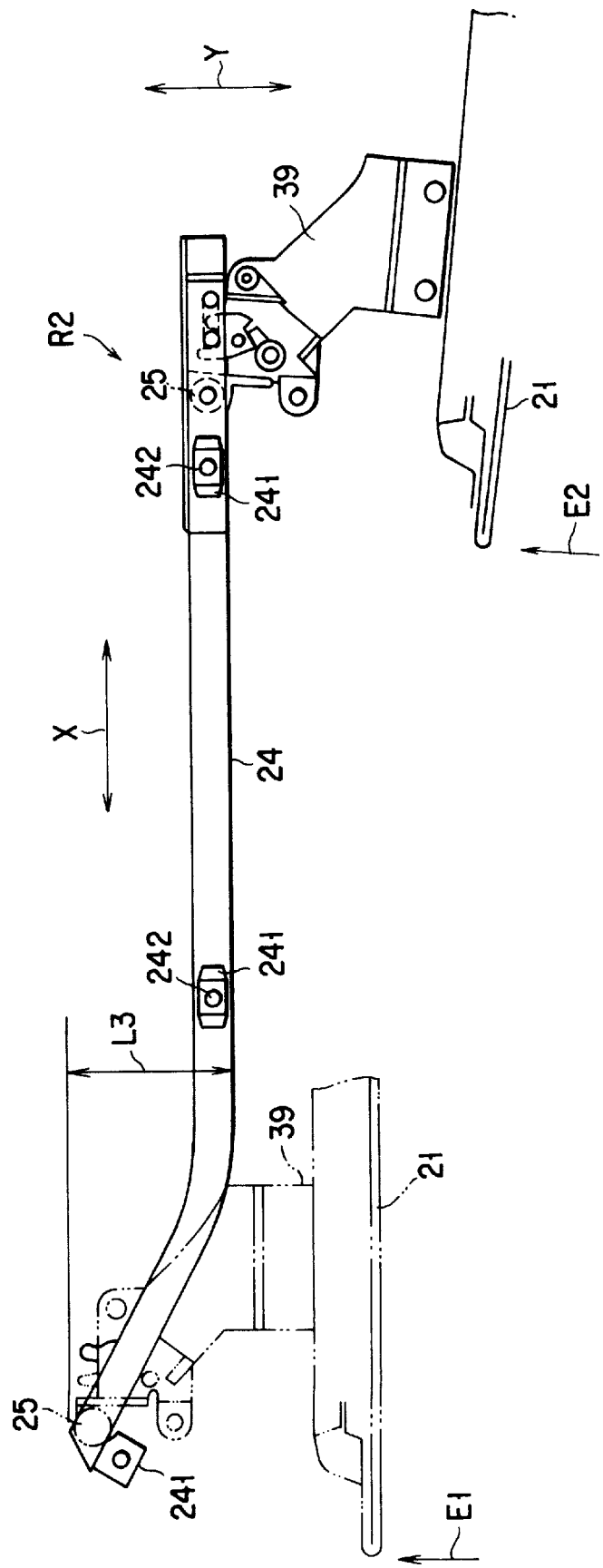
FIG. 7 is a plan view of an upper rail used in the supporting apparatus of FIG. 1.

As seen from FIGS. 7 and 9 to 12, the central part and rear part (right-hand side in FIG. 7) of the upper rail 24 of the upper guide mechanism R2 extend in the longitudinal direction X of the vehicle body. The front portion of the rail 24 is inclined inward with respect to the longitudinal direction X. A plurality of brackets 241 are provided on a downward wall 221 (shown in FIG. 12) of the roof side rail 22. The front portion of the upper rail 24 is fixed to the roof side rail 22 by means of bolts 242 that penetrate the brackets 241, individually. As shown in FIG. 7, the front portion of the rail 24 is biased inward (upward in FIG. 7) for a distance L3 from the central and rear parts of the upper rail 24. When the sliding door 21 is moved to the fully closed position E1 (shown in FIG. 2), the upper rail 24 having the aforesaid shape guides the door 21 so that an outer wall 213 of the upper part of the door is flush with the outside wall 201 of the entrance 20. When the door 21 is in a fully open position E2 (shown in FIG. 1), it is held projecting sideways from the outside wall 201.

Figure 10:
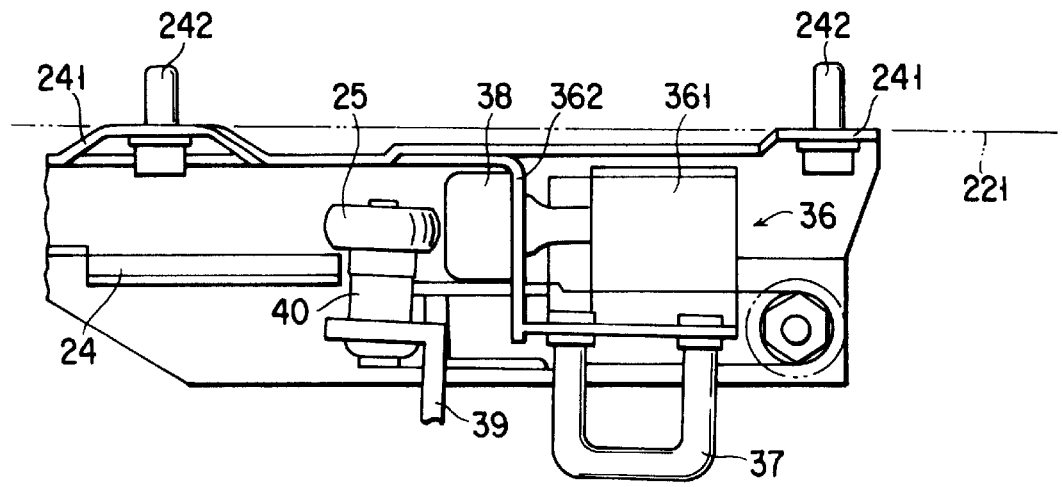
FIG. 10 is a side view showing a spot for the location of a striker of the upper rail.
Figure 11:
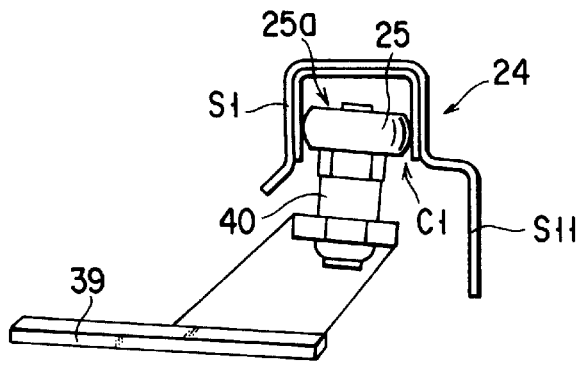
FIG. 11 is a front view of a part of the upper rail taken from its end face side.
Figure 12:
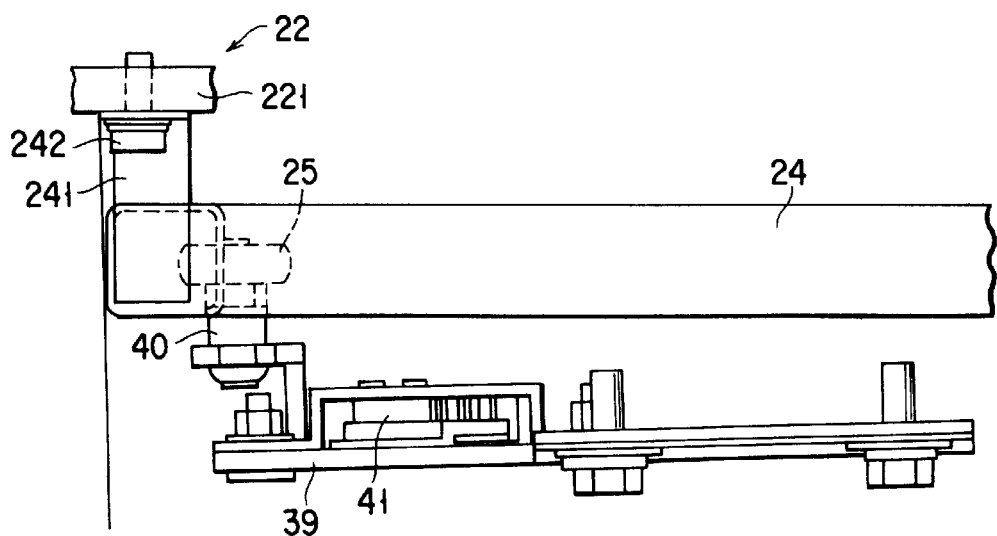
FIG. 12 is a side view showing a spot for the location of a check mechanism of the upper rail.

As shown in FIG. 11, the upper rail 24 includes a rectangular-profile portion S1 having an open-bottomed recess c1. The rotatable upper roller 25 is located inside the portion S1. A downwardly extending portion S11 is provided on the interior side (right-hand side in FIG. 11) of the rectangular-profile portion S1, at the rear part of the upper rail 24. As shown in FIG. 10, a downward U-shaped upper striker 37 is attached to the rear part of the upper rail 24 by means of a bracket 36.

The bracket 36 includes a base 361 for fixing the upper striker 37 to the inner wall of the upper rail 24 and a vertical wall portion 362 extending upward from the front edge of the portion 361. The vertical wall portion 362 is fixed to the upper wall of the rail 24 and supports a stopper rubber 38. The rubber 38 engages the upper roller 25, thereby reducing the shock of door opening operation, when the sliding door 21 is moved to the fully open position E2 (shown in FIG. 1).

Figure 9:
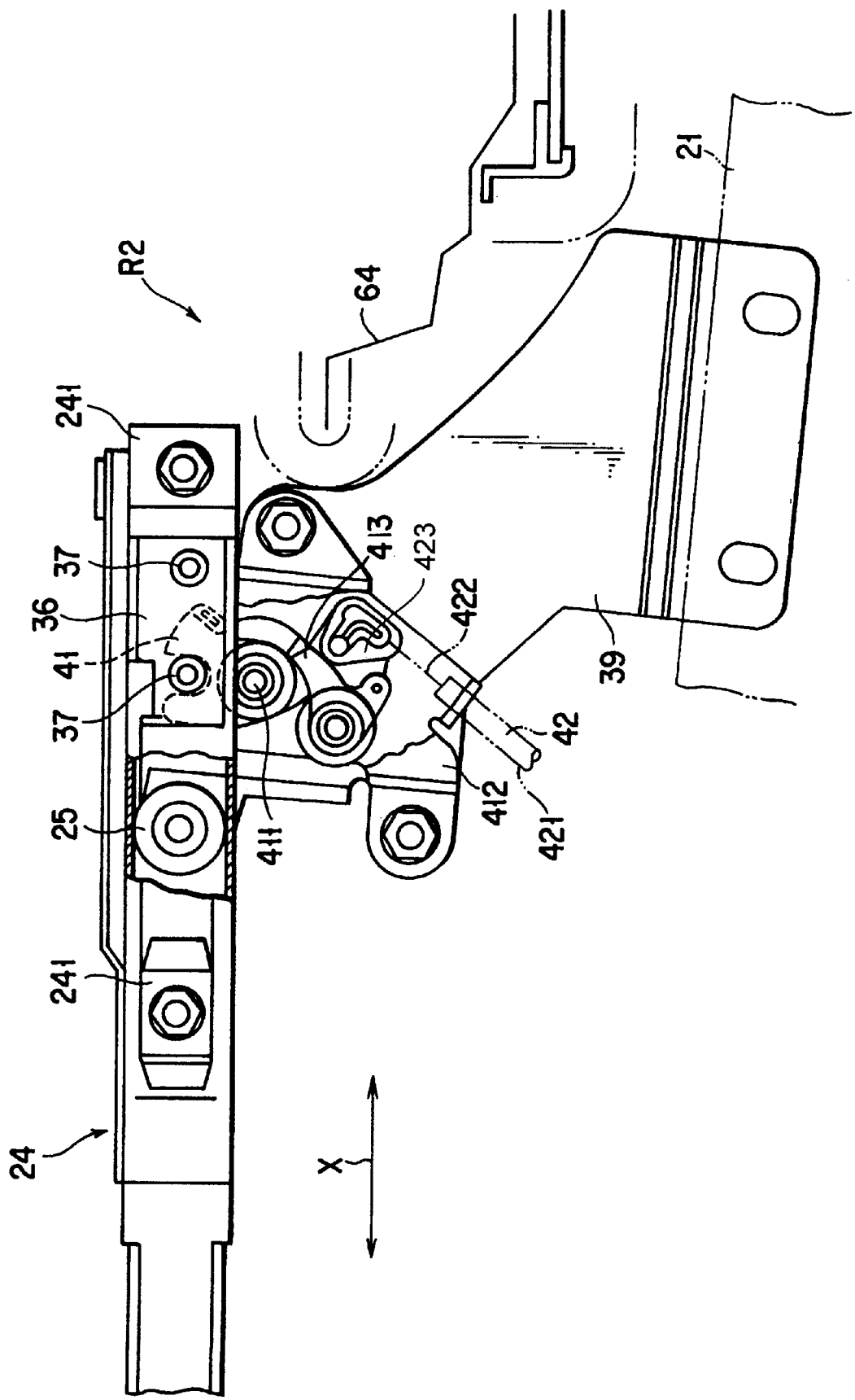
FIG. 9 is a cutaway plan view showing a part of the upper rail.

As shown in FIGS. 4 and 7, the basal part of an upper arm 39 is fixed to the upper part of the front end of the sliding door 21. The upper roller 25 is rotatably mounted on the distal end side of the arm 39 by means of a vertical pin 40 (shown in FIG. 10). The roller 25 constitutes a part of the upper guide mechanism R2. The roller 25 is located inside the upper rail 24. As shown in FIG. 9, the distal end portion of the upper arm 39 is fitted with an upper check member 41, which can engage the upper striker 37. The striker 37 and the check member 41 constitute an upper check mechanism that is provided in a part of the upper guide mechanism R2.

The upper check member 41 is rotatably supported on a bracket 412 by means of a pin 411. The member 41 is urged to engage a pawl 413 by means of a spring (not shown). The check member 41 is locked by the pawl 413 when it is in engagement with the upper striker 37. A cable 42 used to unlock the pawl 413 is composed of an outer tube 421 and an inner wire 422. One end of the inner wire 422 is connected to a pawl operating member 423. The other end of the cable 42 is connected to a check release mechanism 43 on the front center portion of the inner panel 31, as shown in FIG. 4.

The check release mechanism 43 is composed of a swing lever 431, a release handle 433, a bracket 313, etc. The lever 431 is connected with the cable 42 and a cable 52, which is used to operate a lower check member 50 (mentioned later). The handle 433 is coupled to a shaft 432 of the lever 431. The bracket 313 is fixed to the inner panel 31 by means of bolts or the like. A front portion 434 of the bracket 313 is used as the basal part of the check release mechanism 43. The rear part of the bracket 313 is used as the basal part of a release mechanism for a locking mechanism (not shown), which serves to keep the sliding door 21 in the fully closed state.

Figure 8:
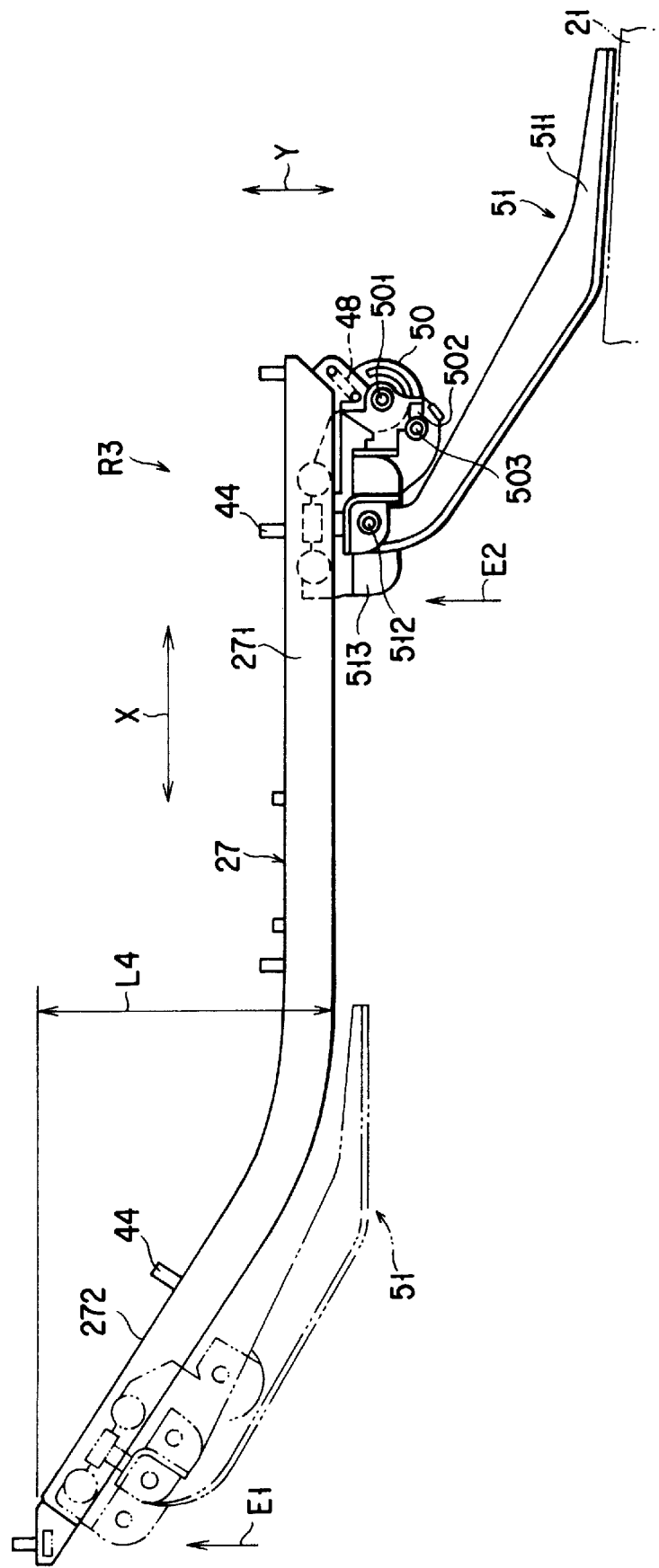
FIG. 8 is a plan view of a lower rail used in the supporting apparatus of FIG. 1.
Figure 16:
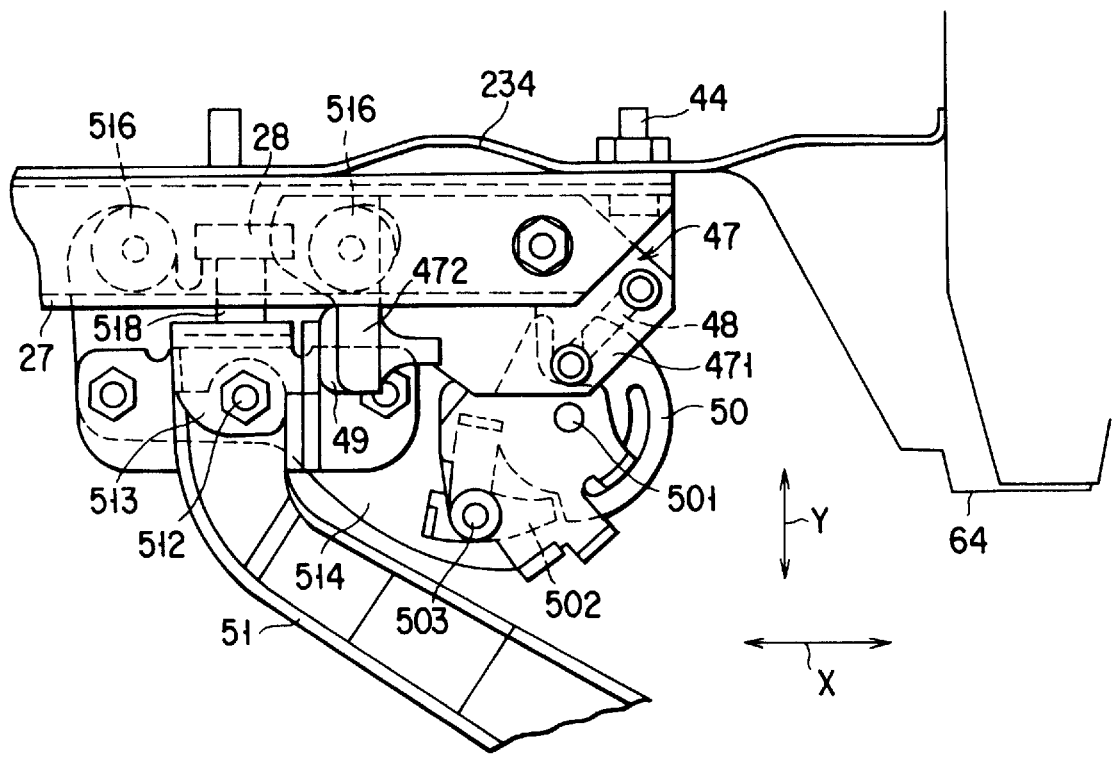
FIG. 16 is a plan view showing the lower rail of FIG. 8 and a lower check mechanism.
Figure 17:
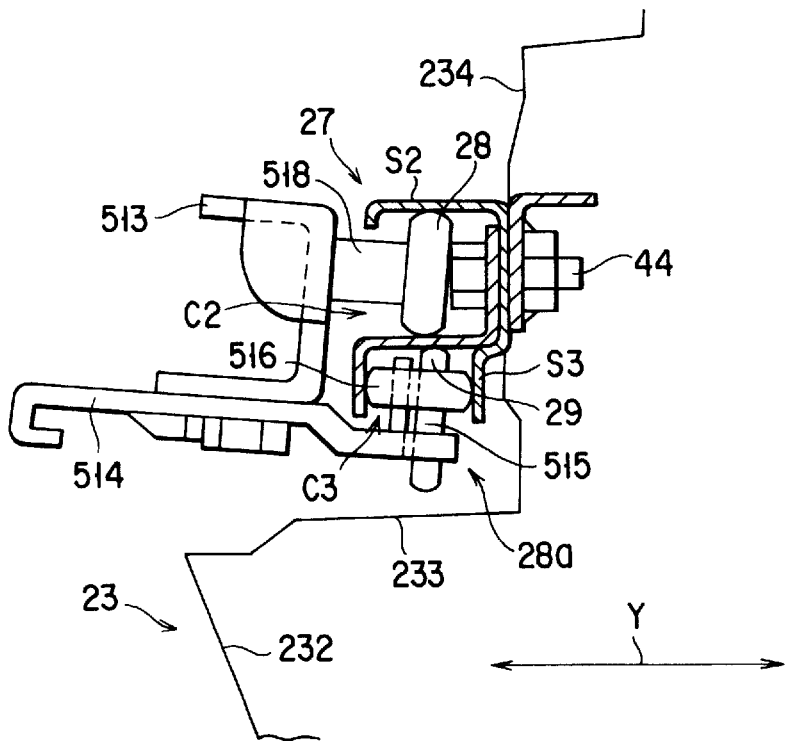
FIG. 17 is a vertical sectional view showing the lower rail of FIG. 8.

As shown in FIG. 8, the lower rail 27, which constitutes a part of the lower guide mechanism R3, has its rear portion 271 extending in the longitudinal direction X of the vehicle body. A front portion 272 of the rail 27 is inclined inward with respect to the longitudinal direction X. As shown in FIGS. 16 and 17, the lower rail 27 is fixed to an inside vertical 234 of the side sill 23 by means of a plurality of bolts 44. As shown in FIG. 8, the front portion 272 of the rail 27 is inclined inward (upward in FIG. 8) with respect to the longitudinal direction X. The front portion 272 is biased inward for a distance L4 from the rear portion 271. When the sliding door 21 is moved to the fully closed position E1 (shown in FIG. 2), the lower rail 27 having the aforesaid shape guides the door 21 so that an outer wall 212 of the lower part of the door is flush with the outside wall 201 behind the entrance 20. When the door 21 is in the fully open position E2 (shown in FIG. 1), on the other hand, it is held projecting sideways from the outside wall 201.

As shown in FIG. 17, the lower rail 27 includes an upper rectangular-profile portion S2 having an open-sided recess c2 and a lower rectangular-profile portion S3 having an open-bottomed recess c3. The lower roller 28 is located inside the portion S2. A vertical guide roller 29 and lateral guide rollers 516, which will be mentioned later, are arranged inside the portion S3. The guide rollers 29 and 516 are provided on the door side.

As shown in FIG. 16, a bracket 47 formed of a metal sheet is provided on the rear end portion of the lower rail 27. A downward U-shaped lower striker 48 is fixed to the bracket 47. The bracket 47 includes a base 471, to which the lower striker 48 is fixed, and a bent portion 472 extending upward from the front edge of the base 471. The bent portion 472 is fixed to the upper wall of the lower rail 27. A stopper rubber 49 is supported by the bent portion 472. The striker 48 and the rubber 49 are located in positions biased outside the lower rail 27 or outward with respect to the bracket 47. The lower check member 50 (mentioned later) is situated in a position such that it can engage the lower striker 48. The distal end portion of a lower arm 51 (mentioned later) is located in a position such that it can abut against the stopper rubber 49.

As shown in FIG. 8, the lower arm 51 is fixed to the lower part of the front end of the sliding door 21. The arm 51 is composed of an arm portion 511 fixed to the door 21 by means of bolts, a bracket 513 swingably coupled to the distal end of the arm portion 511 by means of a vertical pin 512, a swing plate 514 (shown in FIG. 18) coupled to the bracket 513 by means of bolts, etc.

As shown in FIGS. 16 and 17, a lateral pin 518 is provided on a vertical wall of the bracket 513 that is rotatable around the pin 512. The lower roller 28 is mounted on the distal end of the lateral pin 518, and constitutes a part of the lower guide mechanism R3. The rotatable lower roller 28 is located inside the upper rectangular-profile portion S2. As shown in FIGS. 16, 17 and 18, the swing plate 514 has a pair of vertical pins 515 on its inner (upper in FIG. 18) end portion. Each pin 515 supports its corresponding lateral guide roller 516 for rotation. A lateral pin 517 is provided between the pair of guide rollers 516, and the vertical guide roller 29 is mounted on the pin 517. The lower check member 50 is provided on the rear end side (right-hand side in FIG. 18) of the swing plate 514.

As shown in FIG. 17, the central part of the cross section of the lower rail 27 is held between the lower roller 28 and the vertical guide roller 29. By doing this, the lower part of the sliding door 21 can be restrained from shifting its the vertical position. Also, the lower part of the door 21 is restrained from shifting its position in the transverse direction Y by the pair of guide rollers 516 inside the lower rectangular-profile portion S3.

As shown in FIGS. 8 and 18, the lower check member 50 is supported on the swing plate 514 by means of a pin 501. The member 50 is urged in the direction to engage a pawl 502 by means of a spring (not shown). When the check member 50 is in engagement with the lower striker 48, it is locked by the pawl 502. The pawl 502 is rotatably mounted on a support shaft 503. A lever 504 is coupled to the pawl 502. One end of an inner wire 521 of the operating cable 52 is connected to the lever 504. The wire 521 penetrates an outer tube 522. As shown in FIG. 4, the cable 52 is guided into an inner chamber 32 of the sliding door 21. The other end of the inner wire 521 of the cable 52 is connected to the swing lever 431 of the aforesaid check release mechanism 43. The lower striker 48 and the lower check member 50 constitute a lower check mechanism that is provided in a part of the lower guide mechanism R3.

As seen from the above description, the sliding door 21 according to the present embodiment is supported on the vehicle body by means of the center guide mechanism R1, upper guide mechanism R2, and lower guide mechanism R3. When the sliding door 21 is fully open, its position is restrained by the upper and lower check mechanisms in the upper and lower guide mechanisms R2 and R3.

The following is a description of the operation of the sliding door supporting apparatus according to the present embodiment.

When the sliding door 21 is fully closed, that is, when the entrance 20 is closed by the door 21, the door is locked in the fully closed position E1 by a locking mechanism (not shown). When the door 21 is thus situated in the position E1, the curved portion 342 at the rear part of the center rail 34 is supported on the vehicle body by means of the center roller 35 on the center arm 55, as indicated by full line in FIG. 13. As shown in FIG. 2, in this case, the weight of the sliding door 21 is partially transmitted to the center roller 35 in a rolling contact position p5.

The upper part of the sliding door 21 is supported on the upper rail 24 on the vehicle body side by means of the upper roller 25 in a rolling contact position p4. The rail 24 and the roller 25 serve to restrain the upper part of the door 21 from shifting its position in the transverse direction Y. The lower part of the door 21 is supported on the lower rail 27 by means of the lower roller 28 and the vertical guide roller 29 in a rolling contact position p6. The weight of the door 21 is partially supported by the lower roller 28. In this position p6, moreover, the lateral guide rollers 516 are in contact with the lower rail 27, so that the door 21 is restrained from shifting its position in the transverse direction Y.

When the sliding door 21 is closed, the middle rolling contact position p5 is kept at a relatively long distance L2 from the upper and lower rolling contact positions p4 and p6 with respect to the longitudinal direction X. The center of gravity G of the door 21 is situated inside a line that connects the three contact positions p4, p5 and p6. Thus, the sliding door 21 is supported steadily on the vehicle body.

When a release handle (not shown) in the vehicle or a door handle 65 outside the vehicle is operated in its unlocking direction by a user, the locking mechanism (not shown) is brought to an unlocked state. In this unlocked state, the sliding door 21 can move from the fully closed position E1 toward the fully open position E2 (shown in FIGS. 1 and 3).

In a movement stroke for the sliding door 21 leading to the fully open position E2, the rolling contact position p4 for the upper roller 25 and the rolling contact position p6 for the lower roller 28 move in the longitudinal direction X. In contrast with this, the rolling contact position p5 for the center roller 35 makes no substantial change in the longitudinal direction X. Accordingly, the upper and lower contact positions p4 and p6 approach the contact position p5 for the center roller 35 with respect to the longitudinal direction X.

In this state, the sliding door 21 is supported on the center roller 35 and the lower arm 51 on the vehicle body side by means of the center rail 34 and the lower roller 28, respectively. The door 21 moves along the center, upper, and lower rails 34, 24 and 27. The upper roller 25 is guided in the longitudinal direction X by the upper rail 24 on the vehicle body side, and the center rail 34 is also guided in the longitudinal direction X by the two outside holdback rollers 53, front and rear, and the two inside holdback rollers 54, front and rear. The vertical and lateral guide rollers 29 and 516 are guided in the longitudinal direction X by the lower rail 27 on the vehicle body side. Thus, the door 21 is restrained from being dislocated in the vertical direction A and transverse direction Y, and can move smoothly in the longitudinal direction X.

When the sliding door 21 reaches the fully open position E2, the upper check mechanism in the upper guide mechanism R2 and the lower check mechanism in the lower guide mechanism R3 are actuated. Thereupon, the upper check member 41 at the upper part of the door 21 engages the upper striker 37, while the lower check member 50 at the lower part of the door 21 engages the lower striker 48. Thus, the sliding door 21 is securely fixed at two spots, upper and lower, on the vehicle body by means of the upper and lower check mechanisms that are widely spaced in the vertical direction.

Accordingly, even though the three rolling contact positions p4, p5 and p6 are concentrated on the front side of the sliding door 21, that is, if the center of gravity G of the door 21 is situated behind the rolling contact positions p4, p5 and p6, when the door 21 is fully open, the rear end portion of the door 21 can be securely restrained from being dislocated in the vertical direction A and longitudinal direction X. In attaching the sliding door 21 to the vehicle body, the fully open position E2 for the door 21 can be settled by utilizing the upper and lower check mechanisms. For example, the position in which the lower check member 50 and the lower striker 48 engage each other is utilized as a reference position for setting the fully open position E2 of the door. After this reference position is set in this manner, the position of the upper check mechanism is adjusted so that the upper check member 41 can easily engage the upper striker 37.

When the sliding door 21 is fully open, the position of the center rail 34 in the transverse direction Y is restrained by the holdback mechanism M that includes the holdback rollers 53 and 54. As a result, the door 21 can be securely restrained from shifting its position in the transverse direction Y. Thus, the sliding door 21 of the present embodiment is supported on the vehicle body in a manner such that it is securely prevented from being dislocated in the vertical direction A, longitudinal direction X and transverse direction Y when in the fully open position.

If a user operates the release handle 433 of the check release mechanism 43 in the vehicle when the sliding door 21 is in the fully open position E2, the respective pawls 413 and 502 of the upper and lower check members 41 and 50 move in their unlocking directions. Since these pawls 413 and 502 are linked together by means of the cables 42 and 52, the upper and lower check members 41 and 50 are simultaneously disengaged from the upper and lower strikers 37 and 48, respectively. The door 21 can be brought to the fully closed position E1 by being moved forward in this state. When the door 21 reaches the fully closed position E1, it is locked as the locking mechanism (not shown) is actuated.

Figure 26:
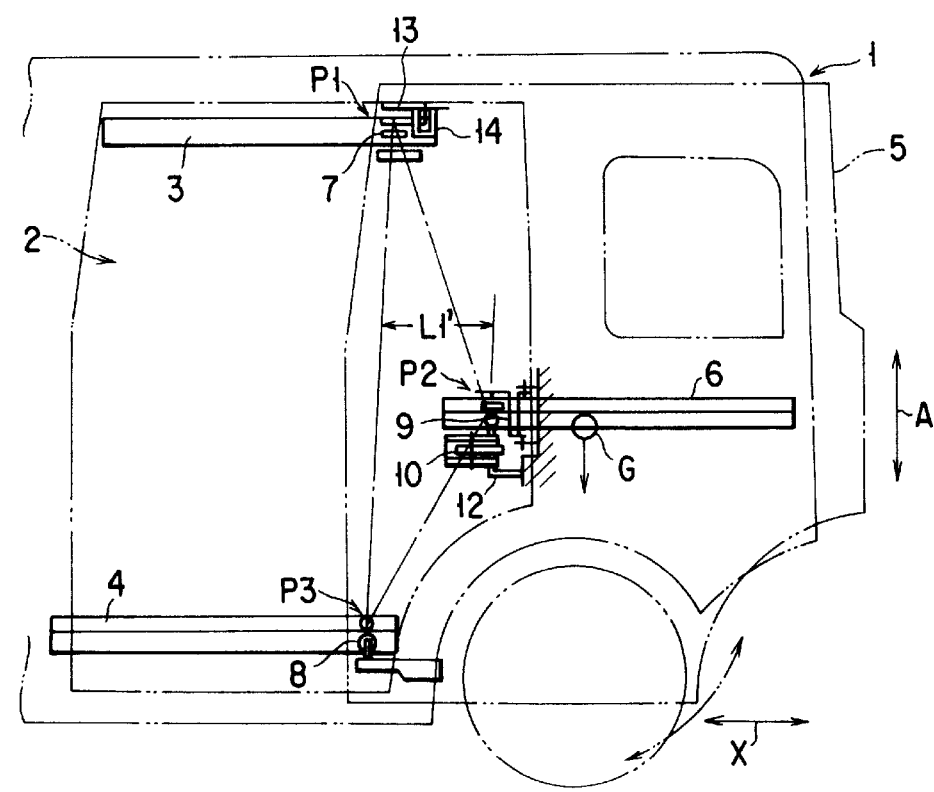
FIG. 26 is a side view of the vehicle shown in FIG. 25, having its door fully open.

In the conventional sliding door supporting apparatus in which the center rail 6 is attached to the sliding door 5, as shown in FIG. 26, the center of gravity G of the door 5 is situated behind the three rolling contact positions p1, p2 and p3 when the door 5 is in its fully open position. Accordingly, the door cannot be steadily supported without a countermeasure.

According to the sliding door supporting apparatus according to the present embodiment shown in FIG. 1, however, the center rail 34 is restrained from being dislocated in the transverse direction Y by the holdback mechanism M when the door is fully open. Also, the sliding door 21 is securely supported by the upper and lower check mechanisms at the upper and lower parts of the door 21. In particular, dislocation of the rear end portion of the door 21 in the vertical, longitudinal, and transverse directions A, X and Y can be restrained effectively.

Figure 20:
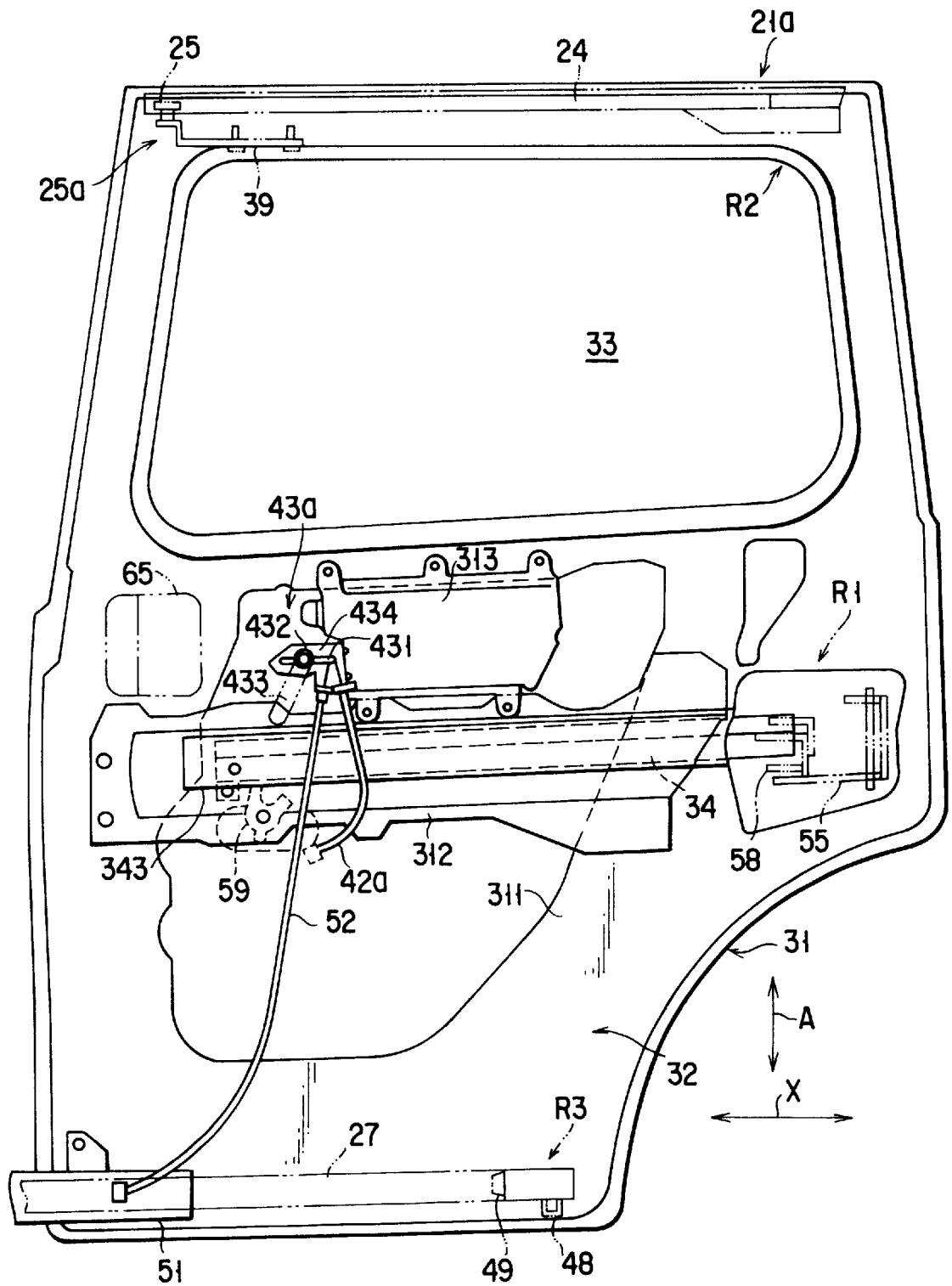
FIG. 20 is a side view showing the sliding door supported by the sliding door supporting apparatus of FIG. 19, having its outer panel removed.
Figure 21:
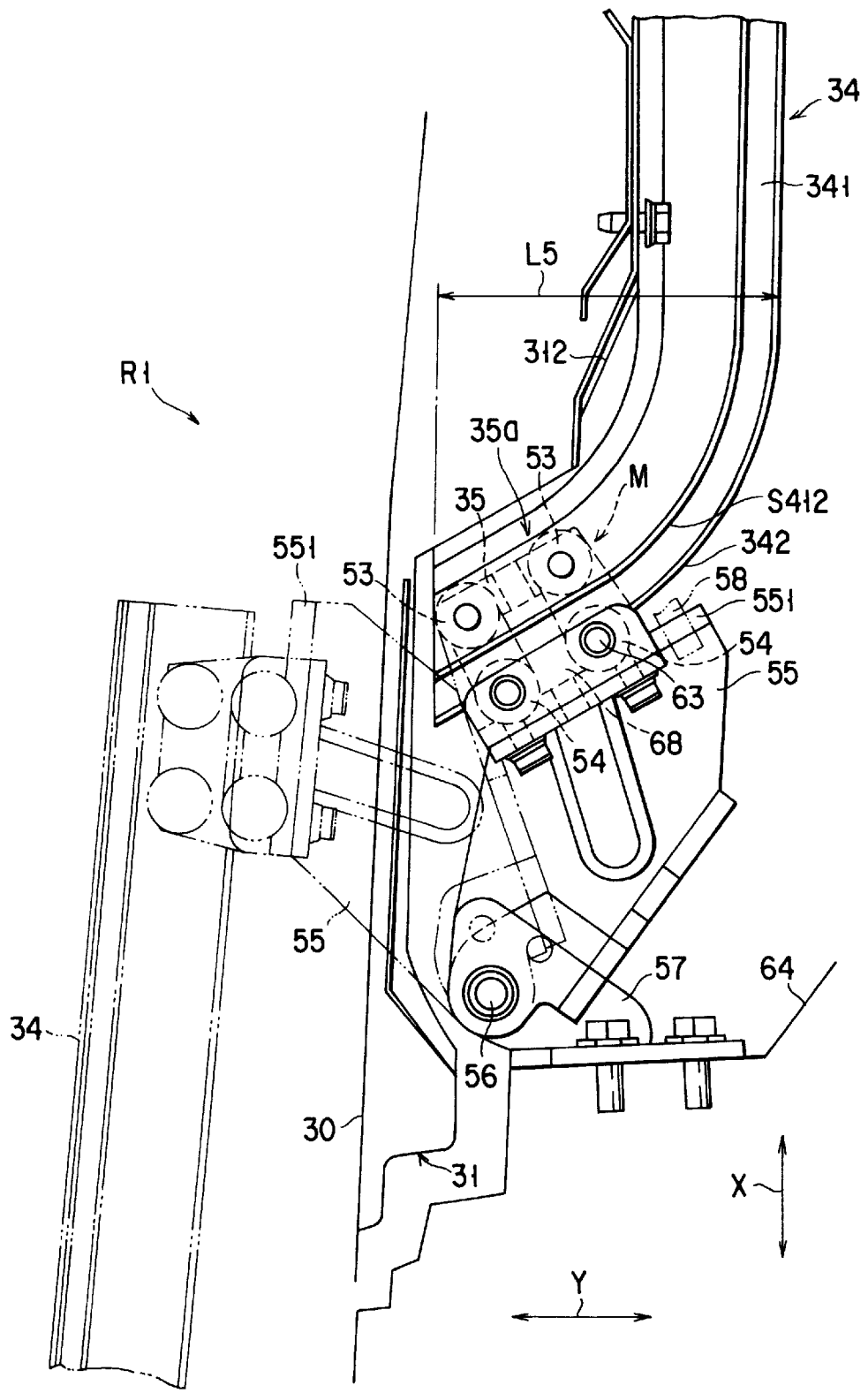
FIG. 21 is a plan view of a center guide mechanism illustrating a modification of the center rail shown in FIG. 13.

In carrying out the present invention, the sliding door supporting apparatus may be constructed in the manner shown in FIGS. 19 and 20. In the sliding door supporting apparatus according to a second embodiment of the invention shown in FIGS. 19 and 20, a part of the center guide mechanism R1 is provided with a center check mechanism in place of the upper check mechanism used in the apparatus of FIG. 1. Other parts of the apparatus of this embodiment are arranged substantially in the same manner as their counterparts in the apparatus of FIG. 1. In the following, therefore, like members common to the two apparatuses are designated by like reference numerals, and a description of those members is omitted.

In the sliding door supporting apparatus shown in FIGS. 19 and 20, a sliding door 21a is supported on the vehicle body by means of the center, upper, and lower guide mechanisms R1, R2 and R3. Check mechanisms are arranged in the center and lower guide mechanisms R1 and R3, respectively. The basal part of the center arm 55 that constitutes a part of the center guide mechanism R1 is swingably mounted on the rear pillar 64. As shown in FIG. 14, a center striker 58 and the center roller 35 are arranged on the vertical portion 551 of the center arm 55. The striker 58 and the roller 35 are situated right under the laterally extending portion S6 of the center rail 34. The rail 34 is attached to the door 21a.

A center check member 59 is located in a position such that it can engage the center striker 58. The member 59 is attached to a front-end lower portion 343 (see FIG. 20) of the center rail 34. The striker 58 and the check member 59 constitutes the center check mechanism that is provided in a part of the center guide mechanism R1.

The center check member 59 is rotatably mounted on a base plate 591 by means of a pin 67, as indicated by two-dot chain line in FIGS. 14 and 15. The base plate 591 is fixed to the reinforcing plate 312 (shown in FIG. 14). The check member 59 is urged to engage a pawl 592 by a spring (not shown). With the member 59 in engagement with the center striker 58, as indicated by two-dot chain line in FIG. 15, the pawl 592 engages an engaging portion 594 of the member 59, thereby locking the member 59. A cable 42a is connected to a release lever 593 that is integral with the pawl 592. As shown in FIG. 20, the other end of the cable 42a is connected to the swing lever 431 of a check release mechanism 43a. The lever 431 is also connected with the cable 52 that extends from the lower check member 50 (shown in FIG. 19). The check release mechanism 43a shown in FIG. 20 differs from the check release mechanism 43 of FIG. 4 only in that the two cables 52 and 42a are connected to the swing lever 431. Other parts of these two release mechanisms are arranged in the same manner.

The sliding door 21a is held in the fully open position E2 by means of the aforesaid center and lower check mechanisms. Thus, when the door 21a is fully open, the rear end portion of the center rail 34 of the door faces the center arm 55, as indicated by two-dot chain line in FIG. 13. Also, the center check member 59 engages the center striker 58, as indicated by two-dot chain line in FIG. 15. As shown in FIGS. 16 and 19, moreover, the lower check member 50 engages the lower striker 48. Accordingly, the sliding door 21a is securely supported on the vehicle body at two spots, middle and lower parts with respect to its vertical direction. Also, the door 21a is restrained from being dislocated in the vertical and longitudinal directions A and X. Further, the holdback mechanism M, which includes the outside and inside holdback rollers 53 and 54, restrains the door 21a from shifting its position in the transverse direction Y.

Thus, the sliding door supporting apparatus according to the second embodiment shown in FIGS. 19 and 20 can enjoy the same effect of the sliding door supporting apparatus of FIG. 1. According to the apparatus of the second embodiment, in particular, dislocation of the rear end portion of the fully opened sliding door 21a can be securely restrained by means of the center and lower check mechanisms in the center and lower guide mechanisms R1 and R3.

Figure 22A:
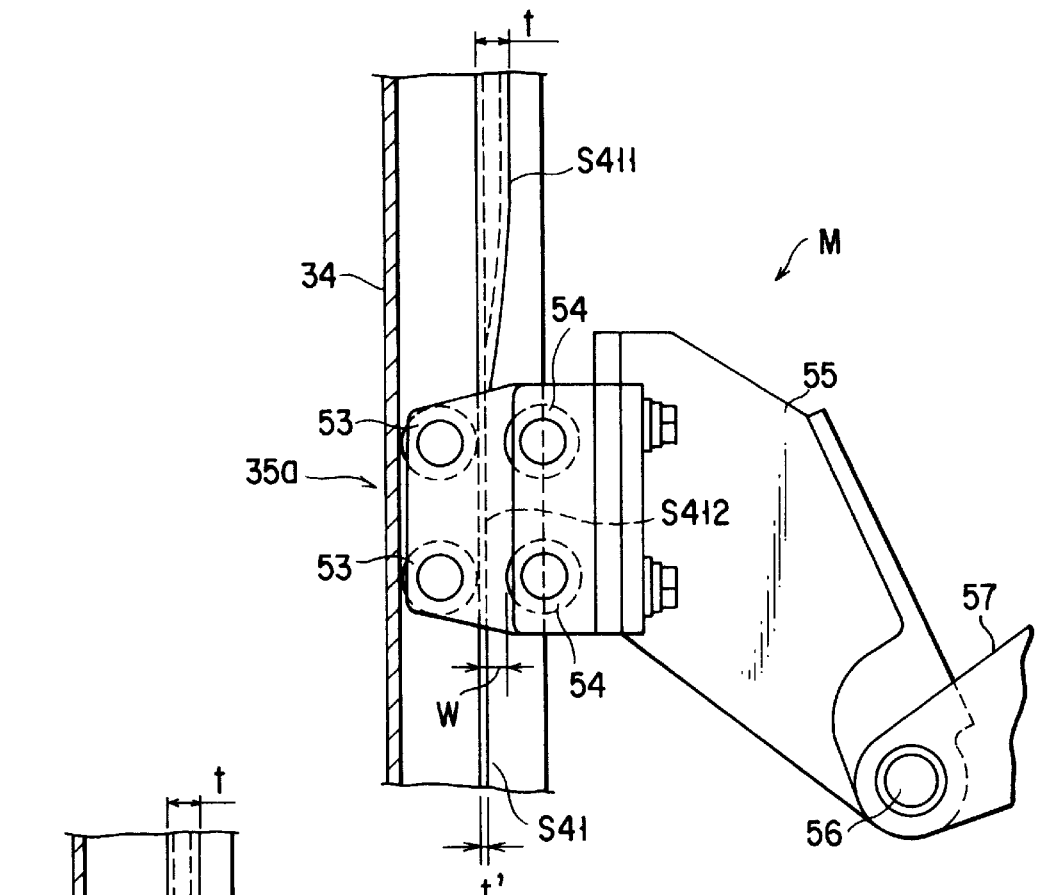
FIG. 22A is a plan view, partially in section, showing a part of the center guide mechanism of FIG. 21.
Figure 24:
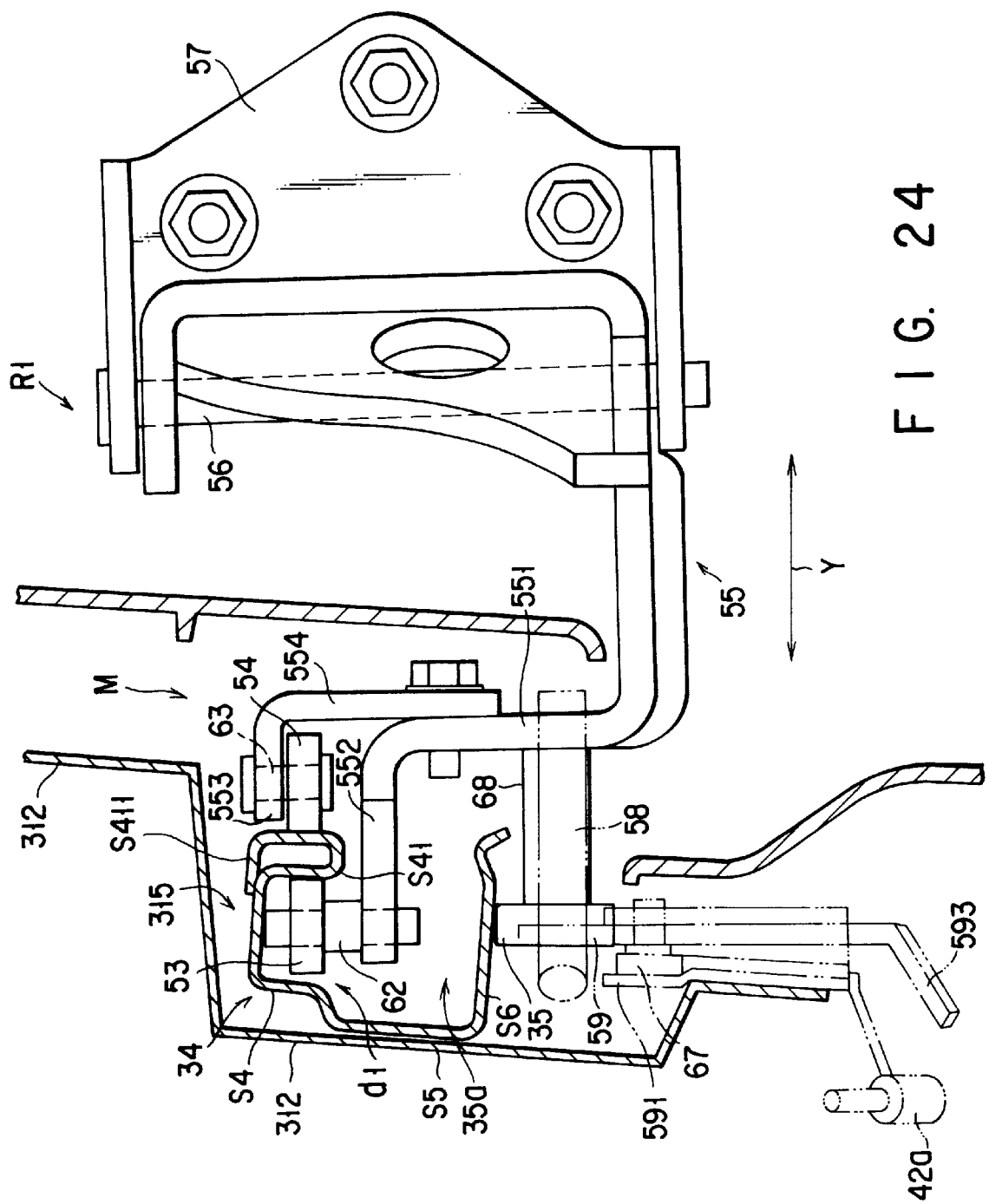
FIG. 24 is a vertical sectional view showing a spot for the location of a wide portion of the center guide mechanism of FIG. 21.
Figure 25:
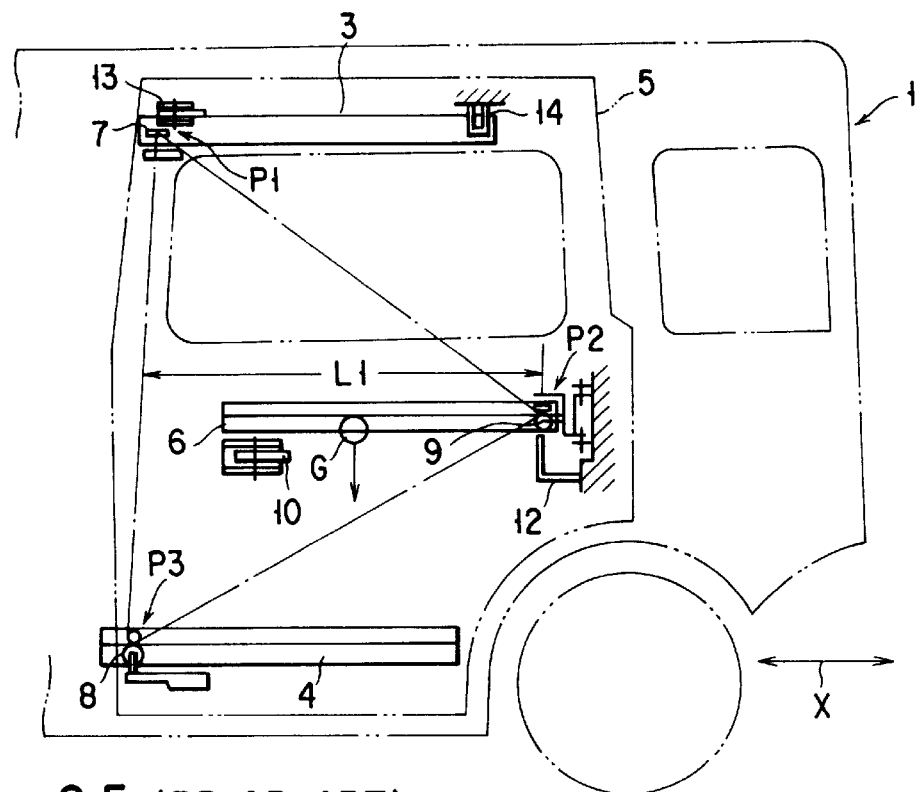
FIG. 25 is a side view of a part of a vehicle with a conventional sliding door supporting apparatus, the door of the vehicle being fully closed.

FIGS. 21, 22A, 23 and 24 show another embodiment of the present invention. In this embodiment, as shown in FIG. 22A, a wide portion S411 is formed on the vertical wall S41 of the center rail 34. As shown in FIG. 24, the two outside holdback rollers 53 are arranged inside the upper rectangular-profile portion S4. The two inside holdback rollers 54, which are paired with their corresponding outside rollers 53, are arranged inside the vertical wall S41 of the upper rectangular-profile portion S4. When the sliding door 21 is in the fully open position E2, the inside holdback rollers 54 touch the inner surface of the wide portion S411 of the vertical wall S41 from the interior side, while the outside holdback rollers 53 touch the outer surface of the wide portion S411 from the exterior side.

Thus, the wide portion S411 of the vertical wall S41 is located in the region where the outside and inside holdback rollers 53 and 54 are situated when the sliding door 21 is moved to the fully open position E2. The distance W (shown in FIGS. 22A and 23) between the rollers 53 and 54 is substantially equal to or a little greater than the thickness t of the wise portion S411. When the door is fully open, therefore, the wide portion S411 of the vertical wall S41 is supported by the rollers 53 and 54 from both sides.

In order to allow the sliding door 21 to move smoothly in the longitudinal direction X except when the door 21 is in the fully open position E2, the whole region of the vertical wall S41 except the wide portion S411 has a narrow portion S412 with a thickness t' smaller than the thickness t of the wide portion S411. Thus, the vertical wall S41 is prevented from coming simultaneously into contact with the outside and inside holdback rollers 53 and 54 by making the thickness t' of the narrow portion S412, on which the rollers 53 and 54 can be situated, sufficiently smaller than the distance W between the rollers when the door 21 is situated in any other position than the fully open position E2.

According to the arrangement described above, dislocation of the fully opened sliding door 21 in the transverse direction Y can be securely restrained by means of the holdback mechanism M that includes the holdback rollers 53 and 54 supported on the center arm 55 on the vehicle body side, the wide portion S411 of the vertical wall S41 having the thickness t, etc. Except when the door 21 is fully open, moreover, the rollers 53 and 54 are situated corresponding to the narrow portion S412 with the thickness t', so that the door 21 can be slid smoothly in the longitudinal direction X.

Figure 22B:
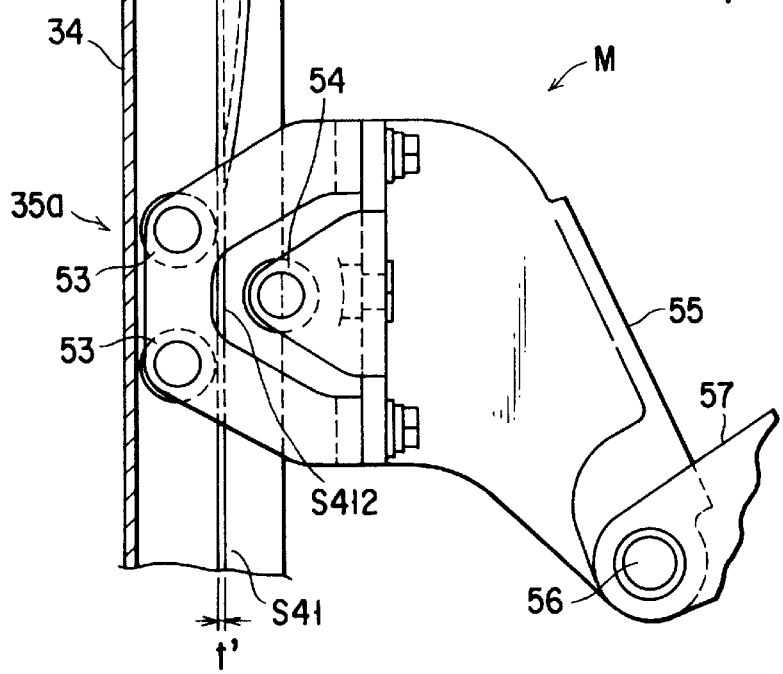
FIG. 22B is a plan view, partially in section, showing a modification of the center guide mechanism.
Figure 23:
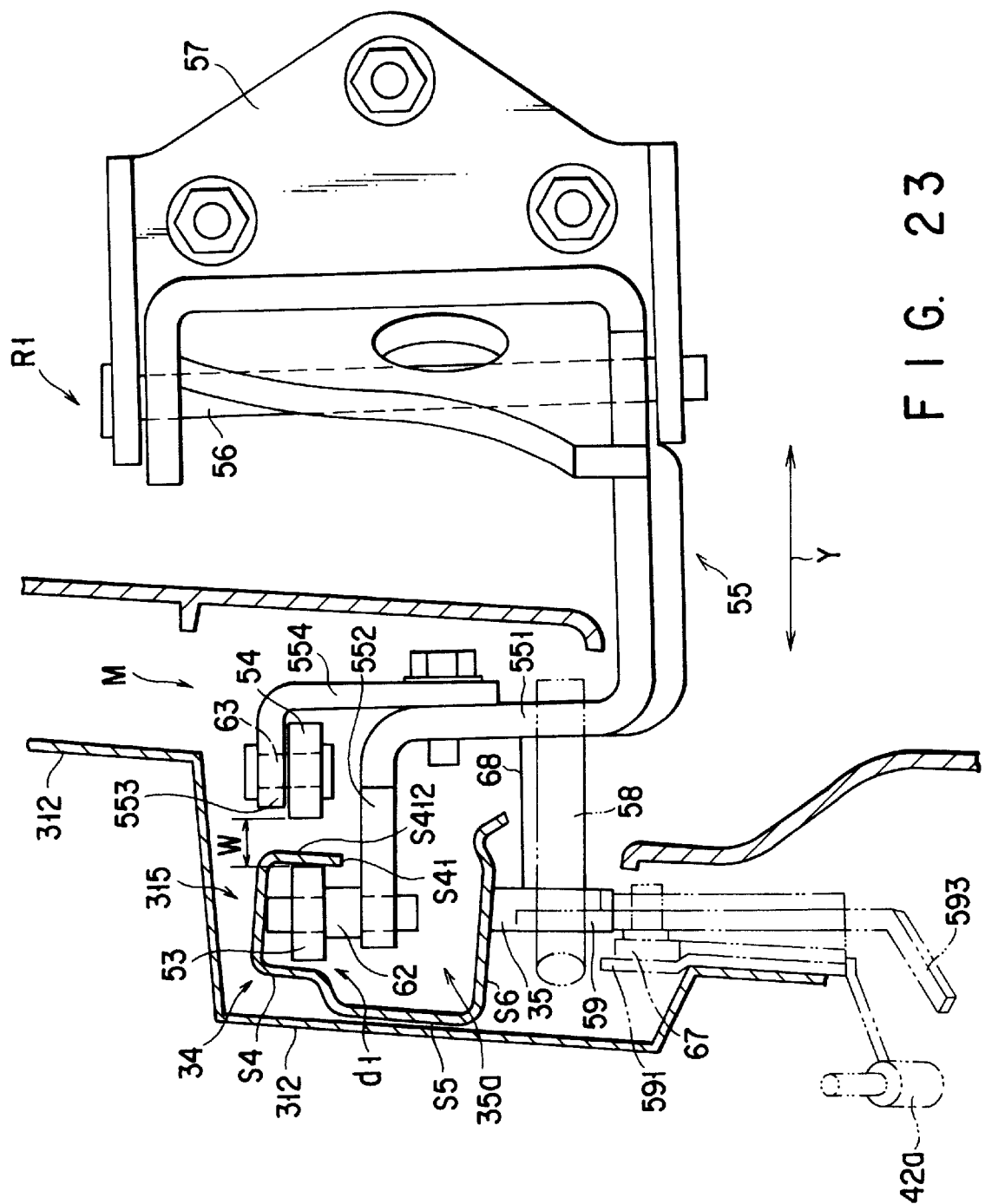
FIG. 23 is a vertical sectional view of the center guide mechanism of FIG. 21.

According to the embodiments described herein, the outside and inside holdback rollers 53 and 54 face one another with the vertical wall S41 between them. In this case, one of the outside roller 53 and the one inside roller 54 opposite thereto constitute a roller pair or set. For example, the holdback mechanism M shown in FIG. 22A uses two roller sets. However, these rollers are not limited to the number used in the foregoing embodiments. As shown in FIG. 22B, for example, the holdback mechanism M may be composed of two outside rollers 53 and one inside roller 54.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A sliding door supporting apparatus for supporting a sliding door, located in an opening in a side face of a body of a vehicle, slidably between a fully closed position and a fully open position, comprising:

a first guide mechanism including,
   a first rail attached to the vertical middle part of the sliding door and extending in the longitudinal direction of the vehicle, and
   first roller means attached to the vehicle body and adapted to engage the first rail to be rollable thereon, thereby supporting the sliding door for movement in the longitudinal direction of the vehicle;

a second guide mechanism including,
   a second rail attached to the upper part of the opening in the vehicle body and extending in the longitudinal direction of the vehicle, and
   second roller means attached to the upper part of the sliding door and adapted to engage the second rail to be rollable thereon;

a third guide mechanism including,
   a third rail attached to the lower part of the opening in the vehicle body and extending in the longitudinal direction of the vehicle, and
   third roller means attached to the lower part of the sliding door and adapted to engage the third rail to be rollable thereon, thereby supporting the door for movement in the longitudinal direction of the vehicle; and a holdback mechanism attached to at least one of the three guide mechanisms, said holdback mechanism including a vertical wall extending from the rail of at least one of the guide mechanisms and having outer and inner surfaces extending in the longitudinal direction of the vehicle, and an outside holdback roller and an inside holdback roller included in the roller means and arranged individually on the opposite sides of the vertical wall, wherein both of said outside and inside holdback rollers make contact with said outer and inner surfaces of said vertical wall, respectively, when the door is in the fully open position to restrain the sliding door from shifting in transverse directions of the vehicle, and only one of said outside and inside holdback rollers makes contact with one of said surfaces when the door is in a position other than the fully open position.

2. A sliding door supporting apparatus according to claim 1, wherein the distance between said inside and outside holdback rollers is determined such that the holdback rollers are in contact with the outer and inner surfaces of the vertical wall when the sliding door is in the fully open position.

3. A sliding door supporting apparatus according to claim 2, wherein said vertical wall has a thickness such that the inside and outside holdback rollers are in contact with the outer and inner surfaces of the vertical wall at positions where the holdback rollers are situated when the sliding door is moved to the fully open position.

4. A sliding door supporting apparatus for supporting a sliding door, located in an opening in a side face of a body of a vehicle, slidably between a fully closed position and a fully open position, comprising:

a first guide mechanism including:
   a first rail attached to the vertical middle part of the sliding door and extending in the longitudinal direction of the vehicle; and
   first roller means attached to the vehicle body and adapted to engage the first rail to be rollable thereon, thereby supporting the sliding door for movement in the longitudinal direction of the vehicle;

a second guide mechanism including:
   a second rail attached to the upper part of the opening in the vehicle body and extending in the longitudinal direction of the vehicle; and
   second roller means attached to the upper part of the sliding door and adapted to engage the second rail to be rollable thereon, thereby supporting the door for movement in the longitudinal direction of the vehicle;

a third guide mechanism including:
   a third rail attached to the lower part of the opening in the vehicle body and extending in the longitudinal direction of the vehicle; and
   third roller means attached to the lower part of the sliding door and adapted to engage the third rail to be rollable thereon, thereby supporting the door for movement in the longitudinal direction of the vehicle; and
   a holdback mechanism attached to at least one of the three guide mechanisms to restrain the sliding door from shifting in transverse directions of the vehicle when the door is in the fully open position, wherein said holdback mechanism includes a vertical wall provided at the rail of at least one of the guide mechanisms and having outer and inner surfaces extending in the longitudinal direction of the vehicle, and at least one outside holdback roller and at least one inside holdback roller included in the roller means and arranged individually on the opposite sides of the vertical wall, and the distance between a plurality of said holdback rollers is determined such that the holdback rollers are in contact with the outer and inner surfaces of the vertical wall when the sliding door is in the fully open position, wherein said vertical wall has a thickness such that the holdback rollers are in contact with the outer and inner surfaces of the vertical wall at positions where the holdback rollers are situated when the sliding door is moved to the fully open position, and wherein said vertical wall includes a narrow portion having a thickness such that the holdback rollers separate from the outer and inner surfaces of the vertical wall when the sliding door is situated in a position other than the fully open position.

5. A sliding door supporting apparatus according to claim 4, wherein said holdback rollers include a pair of holdback rollers facing each other across the vertical wall and constituting one roller set.

6. A sliding door supporting apparatus according to claim 5, wherein a plurality of said roller sets are arranged spaced in the longitudinal direction of the vehicle.

7. A sliding door supporting apparatus according to claim 4, wherein said third guide mechanism includes lower check means for restraining the position of the lower part of the sliding door in the longitudinal direction of the vehicle when the door is in the fully open position, and at least one of the first and second guide mechanisms includes center or upper check means for restraining the position of the door in the longitudinal direction of the vehicle when the door is in the fully open position.

8. A sliding door supporting apparatus according to claim 7, wherein said check means includes a striker attached to the rail or the roller means of the guide mechanism and a check member attached to the roller means or the rail and adapted to engage the striker when the sliding door is moved to the fully open position.

9. A sliding door supporting apparatus according to claim 1, wherein the roller means of said third guide mechanism and either the roller means of said first guide mechanism or the roller means of said second guide mechanism include a roller each for supporting a vertical load of the sliding door.

10. A sliding door supporting apparatus according to claim 7, wherein the roller means of said third guide mechanism and either the roller means of said first guide mechanism or the roller means of said second guide mechanism include a roller each for supporting a vertical load of the sliding door.

11. A sliding door supporting apparatus for supporting a sliding door, located in an opening in a side face of a body of a vehicle, slidably between a fully closed position and a fully open position, comprising:

at least one guide mechanism including,
   a rail attached to either one of the sliding door and the vehicle body and extending in the longitudinal direction of the vehicle, and
   roller means attached to the other of the sliding door and the vehicle body and adapted to engage the rail to be rollable thereon, thereby supporting the sliding door for movement in the longitudinal direction of the vehicle; and
a holdback mechanism attached to said at least one guide mechanism, said holdback mechanism including a vertical wall and having outer and inner surfaces extending in the longitudinal direction of the vehicle, and at least one outside holdback roller and at least one inside holdback roller provided a predetermined distance apart from one another and arranged on the opposite sides of the vertical wall, respectively, wherein
a thickness of said vertical wall being such that the inside and outside holdback rollers are in contact with the outer and inner surfaces of the vertical wall, respectively, at positions where the inside and outside holdback rollers are situated when the sliding door is in the fully open position to restrain the sliding door from shifting in the transverse of the vehicle, and one of said inside and outside holdback rollers separates from the vertical wall when the sliding door is in a position other than the fully open position.

12. A sliding door supporting apparatus according to claim 11, wherein said at least one guide mechanism includes, a first guide mechanism including,
 a first rail attached to the vertical middle part of the sliding door and extending in the longitudinal direction of the vehicle, and
 first roller means attached to the vehicle body and adapted to engage the first rail to be rollable thereon, thereby supporting the sliding door for movement in the longitudinal direction of the vehicle, a second guide mechanism including,
 a second rail attached to the upper part of the opening in the vehicle body and extending in the longitudinal direction of the vehicle; and
 second roller means attached to the upper part of the sliding door and adapted to engage the second rail to be rollable thereon, thereby supporting the door for movement in the longitudinal direction of the vehicle, and a third guide mechanism including,
 a third rail attached to the lower part of the opening in the vehicle body and extending in the longitudinal direction of the vehicle; and
 third roller means attached to the lower part of the sliding door and adapted to engage the third rail to be rollable thereon, thereby supporting the door for movement in the longitudinal direction of the vehicle.

13. A sliding door supporting apparatus according to claim 12, wherein said hold back mechanism is provided in said first guide mechanism.

14. A sliding door supporting apparatus according to claim 11, wherein said vertical wall is provided at the rail of said at least one guide mechanism.

15. A sliding door supporting apparatus according to claim 11, wherein said inside and outside holdback rollers are provided in the roller means.

16. A sliding door supporting apparatus for supporting a sliding door, located in an opening in a side face of a body of a vehicle, slidably between a fully closed position and a fully open position, comprising:

at least one guide mechanism including,
 a rail attached to the vertical middle part of the sliding door and extending in the longitudinal direction of the vehicle, and
 roller means attached to the vehicle body and adapted to engage the rail to be rollable thereon, thereby supporting the sliding door for movement in the longitudinal direction of the vehicle; and
 a holdback mechanism attached to one of said at least one guide mechanism, said holdback mechanism including a vertical wall protruding from the rail and having outer and inner surfaces extending in the longitudinal direction of the vehicle, and at least one outside holdback roller and at least one inside holdback roller included in the roller means and arranged individually on the opposite sides of the vertical wall, wherein both of said outside and inside holdback rollers make contact with said outer and inner surfaces of said vertical wall, respectively, when the door is in the fully open position to restrain the sliding door from shifting in transverse directions of the vehicle when the door is in the fully open position, and only one of said outside and inside holdback rollers makes contact with one of said surfaces when the door is in a position other than the fully open position.

\* \* \* \* \*